US008250076B2

(12) United States Patent
Shinjo et al.

(10) Patent No.: US 8,250,076 B2
(45) Date of Patent: Aug. 21, 2012

(54) BIT STRING SEARCH APPARATUS, SEARCH METHOD, AND PROGRAM

(75) Inventors: Toshio Shinjo, Chiba (JP); Mitsuhiro Kokubun, Chiba (JP)

(73) Assignee: S. Grants Co., Ltd., Chiba (JP)

( * ) Notice: Subject to any disclaimer, the term of this patent is extended or adjusted under 35 U.S.C. 154(b) by 170 days.

(21) Appl. No.: 12/588,522

(22) Filed: Oct. 19, 2009

(65) Prior Publication Data

US 2010/0042596 A1    Feb. 18, 2010

Related U.S. Application Data

(63) Continuation of application No. PCT/JP2008/000983, filed on Apr. 14, 2008.

(30) Foreign Application Priority Data

Apr. 25, 2007    (JP) .................................. 2007-114915

(51) Int. Cl.
*G06F 7/00*    (2006.01)
*G06F 17/30*    (2006.01)
(52) U.S. Cl. ........................................ 707/745; 707/758
(58) Field of Classification Search .................. 707/745, 707/758
See application file for complete search history.

(56) References Cited

U.S. PATENT DOCUMENTS 6,675,163 B1 *   1/2004   Bass et al. .............................. 1/1

FOREIGN PATENT DOCUMENTS

| EP | 2 048 584 A1 | 4/2009 |
| JP | 2001-357070 A | 12/2001 |
| JP | 2006-029619 A | 2/2006 |
| JP | 2008-112240 A | 5/2008 |
| WO | WO-2008/004335 A1 | 1/2008 |

OTHER PUBLICATIONS

International Search Report from PCT/JP2008/000983, dated Jul. 15, 2008.
Shigeaki Yazaki, "*Zu De Wakaru! Programming No. 10 Dai Kisochishiki Data Kozo*," Nikkei Software, vol. 6, No. 2, pp. 44-45 (Jan. 24, 2003).
Office Action dated Dec. 24, 2009 in Japanese application No. 2007-114915.

(Continued)

*Primary Examiner* — Jean B Fleurantin
*Assistant Examiner* — Joshua Bullock
(74) *Attorney, Agent, or Firm* — Rader, Fishman & Grauer PLLC

(57) ABSTRACT

A coupled node tree comprises a root node and a node pair, the node pair being a branch node and leaf node, or a pair of branch nodes, or a pair of leaf nodes arranged in adjacent storage areas. The branch node includes a discrimination bit position of the search key and the first position information of a primary node, one node of a node pair of a link target. The leaf node includes the second position information of the storage area holding an index key that is the target of a search. According to a bit value of the search key of a discrimination bit position in the branch node, repeated linking to a primary node of a node pair of the link target or a node at a position in a memory area adjacent thereto until a leaf node is reached.

10 Claims, 15 Drawing Sheets

OTHER PUBLICATIONS

Jung, M. et al., "A Dynamic Construction Algorithm for the Compact Patricia Trie using the Hierarchical Structure", Information Processing & Management, Elsevier, Barking, GB LNKD-DOI: 10.1016/S0306-4573(01)00031-0, vol. 38, No. 2, Mar. 1, 2002, pp. 221-236, XP004323332 ISSN: 0306-4573.

Li, X., et al., "Stateful Inspection Firewall Session Table Processing", School of Computer Science and Technology, Harbin Institute of Technology, International Journal of Information Technology, vol. 11, No. 2, 2005, pp. 21-30.

Communication from European Patent Office for application No. 08738589.4-2201 dated Nov. 5, 2010.

Daichi Goto, "*Sawatte Manabu Data Kozo, Tsukatte Mini Tsuku Algorithm Kochira Java API Kenkyusho!*" Java Press, vol. 34, pp. 202-210 (Feb. 15, 2004).

R. Sedgewich, Algorithm, vol. 1, 1st edition, Kindai Kagaku Sha Co., Ltd. pp. 49-54 (Oct. 10, 1990).

"*Patorishia Tsuri (Patricia Tree)*", vol. 11, No. 2, pp. 337-339, Journal of Japanese Society for Artificial Intelligence (Mar. 1, 1996).

Nilsson et al., "IP-Address Lookup Using LC-Tries", IEEE Journal on Selected Areas in Communications, vol. 17, No. 6, Jun. 1999.

\* cited by examiner

BIT STRING SEARCH APPARATUS, SEARCH METHOD, AND PROGRAM

CROSS-REFERENCE TO RELATED APPLICATION

This application is a continuation of PCT/JP2008/000983 filed on Apr. 14, 2008, and is based and claims the benefit of priority Japanese Patent Application No. 2007-114915, filed on Apr. 25, 2007, the entire contents of which are incorporated herein by reference. The contents of PCT/JP2008/000983 are incorporated herein by reference in their entity.

BACKGROUND OF THE INVENTION

1. Field of the Invention

The present invention relates to the art of searching for a desired bit string from a set of bit strings and especially relates to the technical field of high speed search by devising a data structure in the form of a tree that stores the bit strings.

2. Description of Related Art

In recent years, with advancements in information-based societies, large-scale databases have come to be used in various places. To search such large-scale databases, it is usual to search for a desired record, retrieving the desired record by using as indexes items within records associated with addresses at which each record is stored. Character strings in full-text searches can also be treated as index keys.

Because the index keys can be expressed as bit strings, the searching of a database is equivalent to searching for bit strings in the database.

In order to perform the above-noted searching for bit strings at high speed, conventional art makes various refinements on the data structure in which bit strings are stored. One of these is a tree structure known as a Patricia tree.

FIG. 1 shows an example of a Patricia tree used for searching processing in the above-noted conventional art. A node of a Patricia tree is formed to include an index key, a test bit position for a search key, and right and left link pointers. Although it is not explicitly shown, a node of course includes information for the purpose of accessing a record corresponding to the index key.

In the example shown in FIG. 1, the node 1750a that holds the index key "100010" is a root node, the test bit position 1730a of which is 0. The node 1750b is connected to the left link 1740a of the node 1750a, and the node 1750f is connected to the right link 1741a of the node 1750a.

The index key held by the node 1750b is "010011," and the test bit position 1730b is 1. The node 1750c is connected to the left link 1740b of the node 1750b, and the node 1750d is connected to the right link 1741b of the node 1750b. The index key held by the node 1750c is "000111," and the test bit position is 3. The index key held by the node 1750d is "011010," and the test bit position is 2.

The parts connected to the node 1750c by a solid lines show the right and left link pointers of the node 1750c, and the left pointer 1740c that is not connected by the dotted line indicates that that field is blank. The dotted line connection destination of the right pointer 1741c that is connected by a dotted line expresses the address indicated by the pointer, and in this case this indicates that the right pointer points to the node 1750c.

The right pointer 1741d of the node 1750d points to the node 1750d itself, and the node 1750e is connected to the left link 1740d. The index key held by 1750e is "010010," and the test bit position is 5. The left pointer 1740e of the node 1750e points to the node 1750b, and the right pointer 1741e of the node 1750e points to the node 1750e.

The index key held by the node 1750f is "101011," and the test bit position 1730f is 2. The node 1750g is connected to the left link 1740f of the node 1750f and the node 1750h is connected to the right link 1741f of the node 1750f.

The index key held by the node 1750g is "100011," and the test bit position 1730g is 5. The left pointer 1740g of the node 1750g points to the node 1750a, and the right pointer 1741g of the node 1750g points to the node 1750g.

The index key held by the node 1750h is "101100," and the test bit position 1730h is 3. The left pointer 1740h of the node 1750h points to the node 1750f, and the right pointer 1741h of the node 1750h points to the node 1750h.

In the example of FIG. 1, the configuration is such that, as the tree is traversed downward from the root node 1750a the test bit position of successive nodes increases.

When a search is performed with some search key, the search keys' bit values corresponding to test bit positions held in nodes are successively tested from the root node, and a judgment is made as to whether the bit value at a test bit position is 1 or 0, the right link being followed if the bit value is 1, and the left link being followed if the bit value is 0.

Unless the test bit position of a link target node is larger than the bit position of the link origin node, that is, if the link target is not below but rather returns upward (the returning links shown by the dotted lines in FIG. 1 being called back links), a comparison is performed between the index key of the link target and the search key. It is assured that if the result of the comparison is that the values are equal the search succeeds, but if the result is non-equal, the search fails.

As described above, although search processing using a Patricia tree has the advantages of being able to perform a search by testing only the required bits, and of it only being necessary to perform an overall key comparison one time, there are the disadvantages of an increase in storage capacity caused by the inevitable two links from each node, the added complexity of the decision processing because of the existence of back links, delay in the search processing by comparison with an index key for the first time by returning by a back link, and the difficulty of data maintenance such as adding and deleting a node.

In order to resolve these disadvantages of the Patricia tree, there is, for example, the technology disclosed in Patent Reference 1 below. In the Patricia tree described in Patent Reference 1 below, by storing lower level sibling nodes in a contiguous area, the space need for pointers is reduced as well as by setting a bit in each node to show whether or not the next link is a back link the determination processing for back links is reduced.

However, even in the disclosure of Patent Reference 1 below, since each node always reserves an area for the index key and the area for a pointer, and a single pointer is used for storing lower level sibling nodes in a contiguous area as shown for example even in the parts of left pointer 1740c, right pointer 1741h, etc. that are the lowest level parts of the Patricia shown in FIG. 1, the same amount of space must be allocated, etc., and there is not a very big space reduction effect.

Also the problem of the delay in the search processing caused by a back links, and the difficulty of processing such as adding and deleting, etc., is not improved. Patent Document 1: Japanese Published Patent Application 2001-357070

SUMMARY OF THE INVENTION

In order to resolve the problems in the above-noted conventional art, in the patent application 2006-187827 the applicant proposed a bit string search (method) using a coupled node tree, which tree is a tree structure for bit string searches formed by a root node and a node pair stored in adjacent areas that is formed by a branch node and a leaf node, branch nodes, or leaf nodes; the root node showing the start point of the tree and being a leaf node if there is only one node in the tree and being a branch node if there are two or more nodes in the tree; the branch node including a discrimination bit position in the search key and information indicating a position of one node of a node pair of a link target; and the leaf node containing index keys that are the target bit strings of a bit string search.

The above cited patent application proposes a method for generating a coupled node tree from a set of obtained index keys, by repetitively inserting leaf nodes that include the obtained index keys, and a method for deleting from the coupled node tree the node with the specified delete key as its index key.

It also explains that the coupled node tree configuration is uniquely stipulated by the set of index keys.

The bit string searches may also include various kinds of search requests, such as requests to find a minimum value or maximum value or searches for a value within a given range, etc. Regarding this point, this applicant proposed methods, etc., of obtaining maximum/minimum values of index keys included in any arbitrary subtree of a coupled node tree in patent application 2006-293619.

Also each of the above cited patent applications propose that the coupled node tree is disposed in an array and that, in each of the search processing proposed above, the array element number of the nodes on the search path over the tree from the search start node are successively stacked in a search path stack, and the processing uses the array element numbers stacked in the search path stack.

Regarding the above coupled node tree, if, after the size of the array elements is fixed, a long index key that cannot be stored within the size of those array elements is to be used, it is desirable to efficiently insert a leaf node corresponding to that index key into the coupled node tree. Also, in the case of long index keys, it is desirable to use storage areas efficiently without allocating excessive memory areas for branch nodes.

The purpose of this invention is that, instead of requiring the length of the index keys to be decided in advance, if even long index keys are to be used, this invention should, in order to enable memory areas to be used efficiently, improve the structure of the coupled node tree and propose search methods for that improved coupled node tree, and methods for inserting into that coupled node tree nodes corresponding to specified index keys, and methods for deleting from that coupled node tree nodes corresponding to specified index keys.

Also, according to a preferred embodiment of this invention, a coupled node tree with the data structure below is provided and an index key search is executed on that coupled node tree.

And, according to a preferred embodiment of this invention, a method is provided for inserting or deleting leaf nodes corresponding to a specified index key, with respect to that coupled node tree.

The coupled node tree of this invention comprises a root node and a node pair, the node pair being a branch node and leaf node, or a pair of branch nodes, or a pair of leaf nodes arranged in adjacent storage areas. The root node is a node that expresses a starting point of the tree and, which is a leaf node when there is one node in the tree and a branch node when there are two or more nodes in the tree.

The branch node includes a discrimination bit position of the search key for the bit string search and the first position information indicating a position of a primary node of a node pair, which is one node of a node pair of a link target.

The leaf node includes the second position information indicating the position of the storage area holding an index key that is a bit string that is the target of a search.

Although the fact that the search using a coupled node tree according to a preferred embodiment of this invention is one that executes a search by using any arbitrary node of the coupled node tree as the search start node with a search key, making that search start node as the root node of an arbitrary subtree of the coupled node tree which becomes the object of the search, and the fact that the search is performed in response to a bit value of an index key at the discrimination bit position included in the branch node, by repeated linking to the primary node of a node pair of the link target or a node at a position in a memory area adjacent thereto until the leaf node is reached are the same as the search disclosed in the above cited patent application, it differs in that the search obtains an index key stored in a storage area referenced by the second position information included in that leaf node as the search result key.

In a preferred embodiment of this invention, to insert into the coupled node tree a leaf node including information that points to a position in a storage area holding an index key made from a new bit string specified as the insertion key, first, using the root node as the search start node and the insertion key as the search key, execute a search from the root node to the leaf node that corresponds to the search result key while storing the path traversed.

Then a value comparison between the insertion key and the search result key and a bit string comparison is made.

By means of the relative positional relationship between a leading bit position at which the bit values differ in a bit string comparison and a discrimination bit position of a branch node stored in the path, the insertion position of the node pair composed of the node wherein the leaf node is to be inserted and one other node is determined. Also which node of the node pair wherein is to be inserted the leaf node including the index key is determined by the value comparison. Furthermore, the information showing the position in the storage area holding the insertion key is stored in the leaf node as the second position information.

In a preferred embodiment of this invention, to delete from the coupled node tree a leaf node including information that points to a position in a storage area holding the index key consisting of the bit string specified as the deletion key, first using the root node as the search start node and the deletion key as the search key, execute the above search.

Then the contents of the node forming a pair with the leaf node that corresponds to the search result key is stored into the branch node of the link origin of that node pair.

Also, the coupled node tree of a preferred embodiment of this invention builds on the special features of the previously cited patent application and has a structure enabling fast searches and also low cost insertion and deletion of nodes.

Again, although the previous application featured a coupled node tree that needed little storage space, the coupled node tree in this invention has an improved structure that enables even more efficient usage of memory capacity.

According to a preferred embodiment of this invention, the index key storage area is separated from the node storage area. Thus even if the storage area for the nodes is decided before hand, the size of the index keys that can be used will not directly restrict that memory size.

Also even in the case of using long index keys, since there is no commensurate increase in the size of the storage area for each of the nodes, even in the illustrative embodiment that allocates each node the same size of storage area, storage space is not used meaninglessly.

DESCRIPTION OF THE PREFERRED EMBODIMENTS

Preferred embodiments of the present invention are described below for the example of storing a coupled node tree in an array just as for the above preferred embodiments.

The address information of a storage device could be used as the data held in a branch node that shows the position of a link target, but by using an array of array elements that can store a larger amount of the areas occupied by branch nodes and leaf nodes, the node position can be expressed with an array element position number, and the amount of information needed for the first position information pointing to the position of the primary node can be reduced.

Figure 2A:
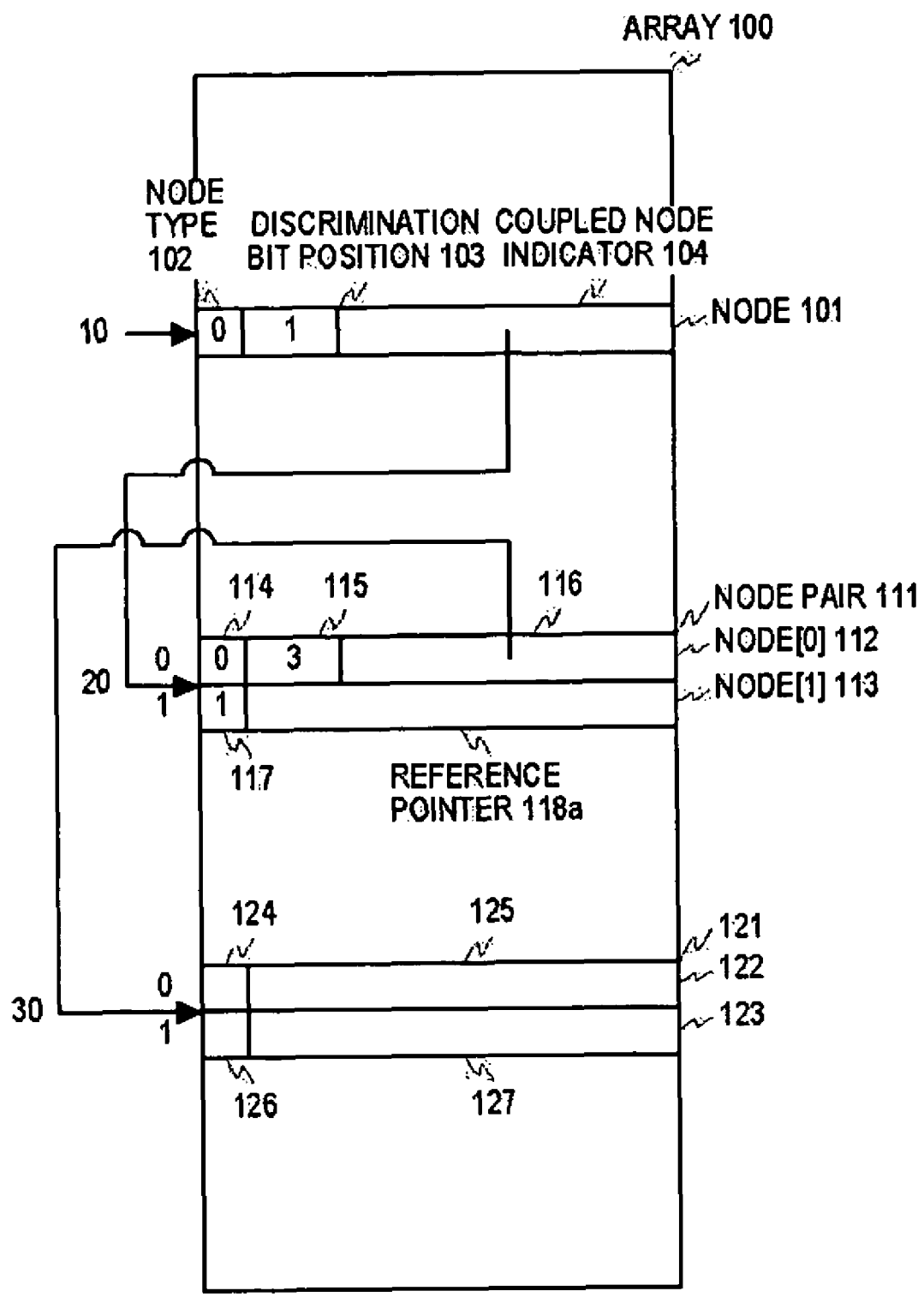
FIG. 2A is a drawing describing an exemplary configuration of a coupled node tree stored in an array according to a preferred embodiment of this invention.

FIG. 2A is a drawing that describes an exemplary configuration of a coupled node tree that is stored in an array.

Referring to FIG. 2A, a node 101 is located at the array element of the array 100 with the array element number 10. The node 101 is formed by a node type 102, a discrimination bit position 103, and a coupled node indicator 104. The node type 102 is 0, which indicates that the node 101 is a branch node. The value 1 is stored in the discrimination bit position 103. The coupled node indicator 104 has stored in it the array element number 20 of the primary node of the node pair of the link target. To simplify notation hereinafter, the array element number stored in a coupled node indicator is sometimes called the coupled node indicator. Also, the array element number stored in a coupled node indicator is sometimes expressed as the code appended to that node or the code attached to a node pair.

The array element having the array element number 20 has stored therein a node [0] 112, which is the primary node of the node pair 111. The secondary node [1] 113 forming a pair with the primary node is stored into the next, adjacent, array element (array element number 20+1). The value 0 is stored in the node type 114 of the node [0] 112, the value 3 is stored in the discrimination bit position 115, and the value 30 is stored in the coupled node indicator 116. Node [1] 113 is also configured with node type 117 and a reference pointer 118a. The value 1 is stored in the node type 117 of the node [1] 113, thereby indicating that the node [1] 113 is a leaf node. In a reference pointer 118a, a pointer that expresses the area in which that index key is stored is stored. The data stored in the reference pointer 118a is a concrete example of the second position information in this preferred embodiment of this invention. In order to shorten the expressions below, the data stored in the reference pointer is also called the reference pointer.

In the same manner as in a Patricia tree described above, although information for accessing a record corresponding to an index key is of course included in a leaf node, this is omitted from the notation.

Although the number of bits needed to express a discrimination bit position is affected by the maximum bit length of the index keys, the former is a logarithm of the latter, and so, even if exceptionally long index keys are used, not very many bits are needed to express the discrimination bit position. Also, for example, if memory addresses or offsets from a given memory address are used as the reference pointer, the bit length of the reference pointers is unrelated to the bit length of the index keys. Thus by configuring leaf nodes so that they include reference pointers rather than index keys, the storage capacity actually needed for the nodes in a coupled node tree has no relationship with the length of the index keys, and can be a relatively small constant value. Ordinarily a large scale database requires long keys in order to distinguish many records, and the bit length of the index keys in that kind of database are often longer than the bit length needed for the array elements in array 100.

Also the index keys may be stored in each of the array elements of a not-shown array that is different than array 100, and the array element numbers of that different array can be used as reference pointers.

For example since if it known beforehand that only a restricted part of the bit string with a length of n bits that comprises the index key is to be used, the number of bits m needed to express the array element number will be less than n, thus by including in leaf nodes the reference pointer rather than the index key, the storage capacity needed for the leaf nodes is reduced.

Primary nodes are indicated as the node [0], and secondary nodes that are paired therewith are indicated as the node [1]. Also the node stored in an array element with some array element number is called the node of that array element number and the array element number stored in the array element of that node is also called the array element number of the node.

In order to express the relationship between the leaf node and the index key stored in the storage area expressed by the reference pointer in that leaf node, the wording of an index key corresponding to the leaf node may sometimes be used and the wording of the leaf node corresponding to the index key may sometimes be used.

The contents of the node pair 121 formed by the node 122 and the node 123 that are stored in the array elements having array element numbers 30 and 31 are not shown.

The 0 or 1 that is appended to the node [0]112, the node [1]113, the node 122, and the node 123 indicates respectively to which node of the node pair linking is to be done when performing a search using a search key. Linking is done to the node having an array element number that is derived by adding the 0 or 1, which is the bit value of the search key at the discrimination bit position of the immediately previous branch node, to the coupled node indicator of the branch node.

Therefore, by adding the bit value of the discrimination bit position of the search key to the coupled node indicator of the immediately previous branch node, it is possible to determine the array element number of an array element storing a node at the link target.

Although in the above-noted example the smaller of the array element numbers at which the node pair is located is used as the coupled node indicator, it will be understood that it is also possible to use the larger of the array element numbers in the same manner.

Figure 2B:
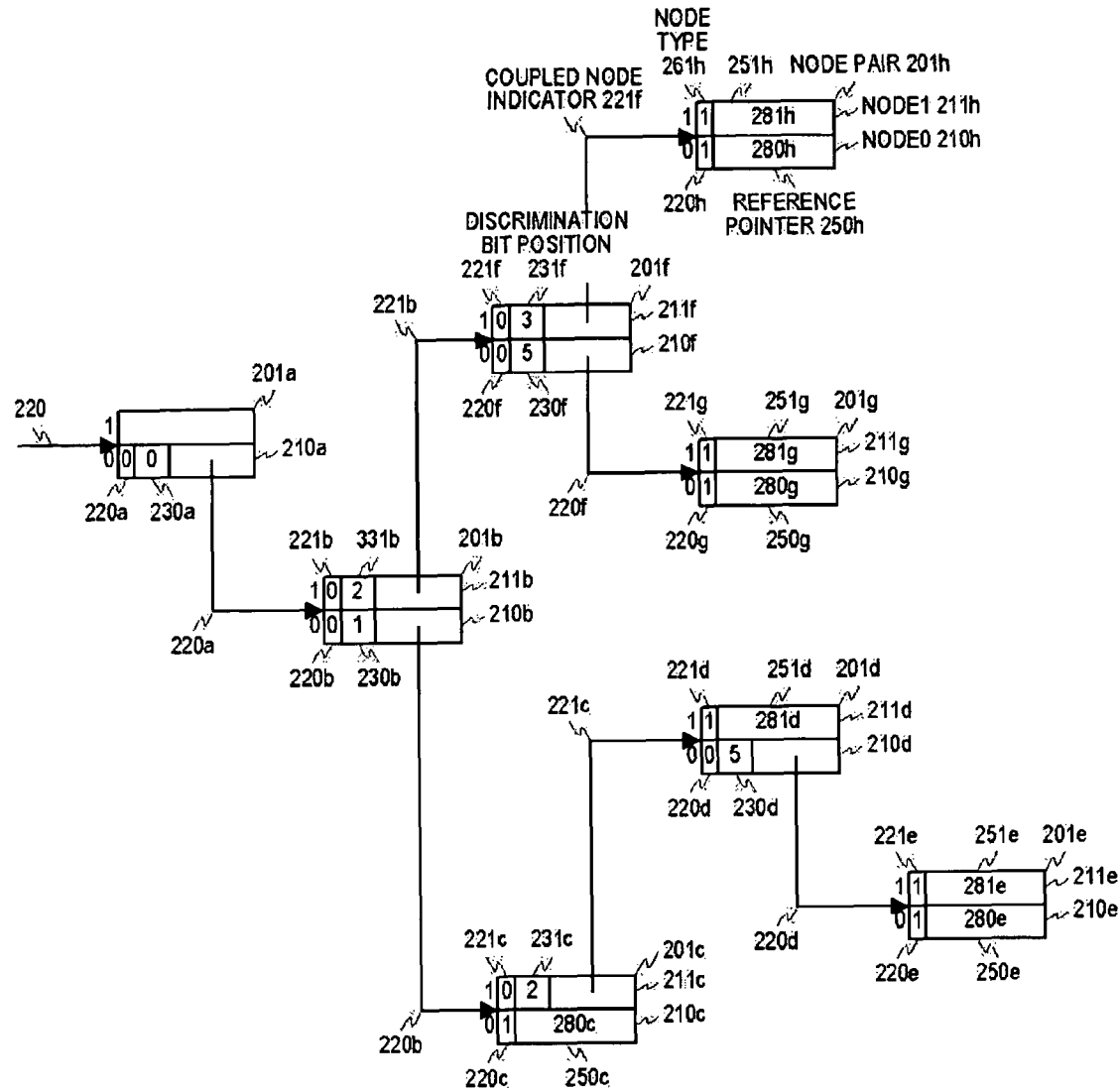
FIG. 2B is a drawing describing a tree structure of a coupled node tree according to a preferred embodiment of this invention.

FIG. 2B is a drawing that describes conceptually the structure of a coupled node tree related to a preferred embodiment of this invention.

That drawing shows the index key storage area 311 that holds the key information of the index keys pointed to by the reference pointer.

The reference numeral 210a shows the root node. In the example shown, the root node 210a is the primary node of the node pair 201a located at the array element number 220.

In this tree structure, a node pair 201b is located below the root node 210a, and below that are located the node pair 201c and the node pair 201f. Below the node pair 201f are located the node pair 201h and the node pair 201g. Below the node pair 201c is located the node pair 201d, and below the node pair 201d is located the node pair 201e.

The 0 or 1 code that is appended before each node is the same as the codes that are appended before the array element numbers described in FIG. 2A. The tree is traversed in accordance with the bit values at discrimination bit positions of the search key, so that the leaf node of the search for item is found.

In the example shown, the node type 260a of the root node 210a is 0, thereby indicating that this is a branch node, and the discrimination bit position 230a indicates 0. The coupled node indicator is 220a, which is the array element number of the array element in which the primary node 210b of the node pair 201b is stored.

The node pair 201b is formed by the node 210b and the node 211b, the node types 260b and 261b thereof both being 0, indicating branch nodes.

The discrimination bit position 230b of the node 210b has 1 stored therein, and in the coupled node indicator of the link target is stored the array element number 220b of the array element in which is stored the primary node 210c of the node pair 201c.

Because 1 is stored in the node type 260c of the node 210c, this node is a leaf node, and thus includes a reference pointer 250c. The pointer referencing the storage area in which index key 290c is stored is contained in reference pointer 250c. The data stored in the reference pointer 250c is also called the reference pointer and is expressed with code 280c. Just as for the other leaf nodes, the reference pointer and the data stored in the reference pointer will be expressed with the same words "reference pointer."

Although FIG. 2B shows an exemplification of the storage areas for multiple index keys stored contiguously and this total contiguous storage area has been expressed as index key storage area 311, it is not necessary to store the index keys in a contiguous area. Also there need be no relationship between the placement sequence of the index keys in index key storage area 311 and the relationship between the leaf nodes themselves in the tree structure. The reference pointer 280c shows the storage area where the index key 290c "000111XXXXXXXX" is stored.

Here, the "XXXXXXXX" part shows a specific bit string with a length of 0 bits or more. Thus of the index keys related to the coupled node tree in FIG. 2B, there is only one key whose 0th to 5th bits contain "000111." A detailed explanation will be provided later but there is no change in the structure of the coupled node tree no matter what is in the "XXXXXXXX" part of the bit string. Just as for the other index keys, since the low order 6th bit and lower are lower than the lowest discrimination bit position 5 in the whole coupled node tree in FIG. 2B, those bits have no effect on the structure of the coupled node tree and are expressed with "X". Whether or not there are bits expressed with "X", if there are such bits, the tree structure of the coupled node tree in FIG. 2B will not change regardless of whether those bits are "0" or "1".

Returning to node pair 201c, node type 261c of the node 211c is 0, the discrimination bit position 231c of the node 211c is 2, and in the coupled node indicator is stored the array element number 221c of an array element in which is stored the primary node 210d of the node pair 201d.

The node type 260 of the node 210d is 0 and the discrimination bit position 230d is 5, and the array element position number 220d of the array element in which is stored the primary node 210e of the node pair 201e is stored in the coupled node indicator.

The node type 261 of the node 211d, which is the other node of the node pair 210d, is 1, and the reference pointer 281d, which points to the storage area which holds the index key called "011010XXXXXXXX", is stored in reference pointer 251d.

The node types 260e and 261e of the nodes 210e and 211e of the node pair 201e are both 1, indicating that both are leaf nodes.

The reference pointers 280e and 281e, which point to the storage areas holding the index key 290e called "010010XXXXXXXX" and the index key 291e called "010011XXXXXXXX", are stored in reference pointers 250e and 251e of the nodes 210e and 211e respectively.

The discrimination bit position 231b of the node 211b, which is the other node of the node pair 201b, has 2 stored therein, and the array element number 221b of the array element in which is stored the primary node 210f of the node pair 201f is stored in the coupled node indicator of the link target.

The node types 260*f* and 261*f* of the nodes 210*f* and 211*f* of the node pair 201*f* are both 0, indicating that both are branch nodes. In the discrimination bit positions 230*f* and 231*f* of each are stored 5 and 3, respectively. The array element number 220*f* of the array element in which is stored the primary node 210*g* of the node pair 201*g* is stored in the coupled node indicator of the node 210*f*, and the array element number 221*f* of an array element in which is stored the node [0]210*h*, which is the primary node of the node pair 201*h*, is stored in the coupled node indicator of the node 211*f*.

The node types 260*g* and 261*g* of the nodes 210*g* and 211*g* of the node pair 201*g* are both 1, indicating that both are leaf nodes.

The reference pointers 280*g* and 281*g*, which point to the storage areas holding the index key 290*g* called "100010XXXXXXXX" and the index key 291*g* called "1100011XXXXXXXX", are stored in reference pointers 250*g* and 251*g* of the nodes 210*g* and 211*g* respectively.

In the same manner, the node types 260*h* and 261*h* of the node [0]210*h* of the node pair 201*h*, and the node [1]211*h*, which is paired therewith, are both 1, indicating that both are leaf nodes.

The reference pointers 280*h* and 281*h*, which point to the storage areas holding the index key 290*h* called "101010XXXXXXXX" and the index key 291*h* called "101011XXXXXXXX", are stored in reference pointers 250*h* and 251*h* of the nodes 210*h* and 211*h* respectively.

The processing flow in searching for the index key "100010" from the above-noted tree is briefly described below. The discrimination bit positions are numbered 0, 1, 2, . . . and so on from the left.

First, processing is started from the root node 201*a* using the bit string "100010" as the search key. Because the discrimination bit position 230*a* of the root node 210*a* is 0, examining the bit value of the search key "100010" at the discrimination bit position 0 reveals 1. This being the case, 1 is added to the array element number 220*a* stored in the coupled node indicator and linking is done to the node 211*b* stored in the resulting array element number.

Because 2 is stored in the discrimination bit position 231*b* of the node 211*b*, examination of the bit value of the search key "100010" at the discrimination bit position 2 reveals 0, resulting in linking to the node 210*f* stored in the array element having the array element number 221*b* stored in the coupled node indicator.

Because 5 is stored in the discrimination bit position 230*f* of the node 210*f*, and because examination of the bit value of the discrimination bit position 5 of the search key "100010" reveals 0, linking is done to the node 210*g* stored in the array element having the array element number 220*f* stored in the coupled node indicator.

Because the node type 260*g* of the node 210*g* is 1, indicating a leaf node, the storage area referenced by reference pointer 280*g* is accessed and the index key 290*g* stored there is read out and compared to the search key.

For example, assuming that the bits shown with an "X" do not exist, then the index key 290*g* and the search key both have the value "100010" and they coincide.

Searching is performed in this manner using the coupled node tree.

Next, the significance of the configuration of the coupled node tree will be described, with reference made to FIG. 2B.

The configuration of the coupled node tree is defined according to a set of index keys. In the example of FIG. 2B, the discrimination bit position of the root node 210*a* is 0 because there is an index key having a 0 at the 0th bit and an index key having a 1 at the 0th bit in the index keys shown in the example of FIG. 2B. The group of index keys having 0 at the 0th bit is classified under the node 210*b*, and the group of index keys having 1 at the 0th bit is classified under the node 211*b*.

That the discrimination bit position of the node 211*b* is 2 reflects a property of the index keys, this being that the 1st bits of all the nodes 211*h*, 210*h*, 211*g*, and 210*g* are the same value 0, a difference therebetween first occurring at the 2nd bit.

Similar to the case of the 0th bit, the cases of the 2nd bit being 1 are classified on the node 211*f* side, and the cases of the 2nd bit being 0 are classified on the node 210*f* side.

Because index keys having a 2nd bit that is 1 differ with regard to the 3rd bit, 3 is stored in the discrimination bit position of the node 211*f*, and because the 3rd and 4th bits of index keys having 0 as the 2nd bit are the same and differ at the 5th bit, 5 is stored in the discrimination bit position of the node 210*f*.

At the link target of the node 211*f*, because there is only one having a 3rd bit of 1 and one having a 3rd bit of 0, nodes 210*h* and 211*h* are leaf nodes, with "101011XXXXXXXX" and "101100XXXXXXXX" stored in the reference pointers 250*h* and 251*h*, respectively.

Even in the event that the index key set includes "101101XXXXXXXX" or "101110XXXXXXXX" in place of "101100XXXXXXXX," because there is equality with "101100XXXXXXXX" up until the 3rd bit, only the reference pointer 281*h* stored in the node 211*h* would change, there being no change in the structure of the tree itself. However, if "101101XXXXXXXX" is included in addition to "101100XXXXXXXX," the node 211*h* would become a branch node, the discrimination bit position thereof being 5. If the index key to be added is "101110XXXXXXXX," the discrimination bit position would be 4.

As described above, the coupled node tree structure is determined by the bit values of each bit position of the index keys included in the set of index keys.

To add to the above, because there is branching for each bit position having different bit values, meaning between a node that has a bit value of 1 and a node that has a bit value of 0, if the leaf nodes are traversed giving priority to the node [1] side and the tree depth direction, the index keys stored therewithin will be "101100XXXXXXX" for the index key 291*h* of the node 211*h*, "101011XXXXXXXX" for the index key 290*h* of the node 210*h*, . . . , and "000111 XXXXXXXX" for the index key 290*c* of the node 210*c*, these being sorted in descending order.

That is, in a coupled node tree the index keys are disposed in the tree in a sorted sequence.

When searching using a search key, the index key is followed over a path disposed on a coupled node tree, and in the case, for example of a search key "101100" it is possible to reach the node 211*h*. As can be imagined from the above-noted description, even if the search key is made "101101" or "101110," the node 211*h* will be reached, and a comparison with the index key 291*h* which is stored in the storage area pointed to by the reference pointer 281*h* will result in the search failing.

Also, even in the case in which searching is done with "100100," in the link path of nodes 210*a*, 211*b*, and 210*f*, because the 3rd and 4th bits of the search key are not used and the 5th bit is 0, the node 210*g* will be reached, similar to the case searching with "100010." In this manner, the discrimination bit positions are used in accordance with bit makeup of the index keys stored in the coupled node tree to perform branching.

Figure 3:
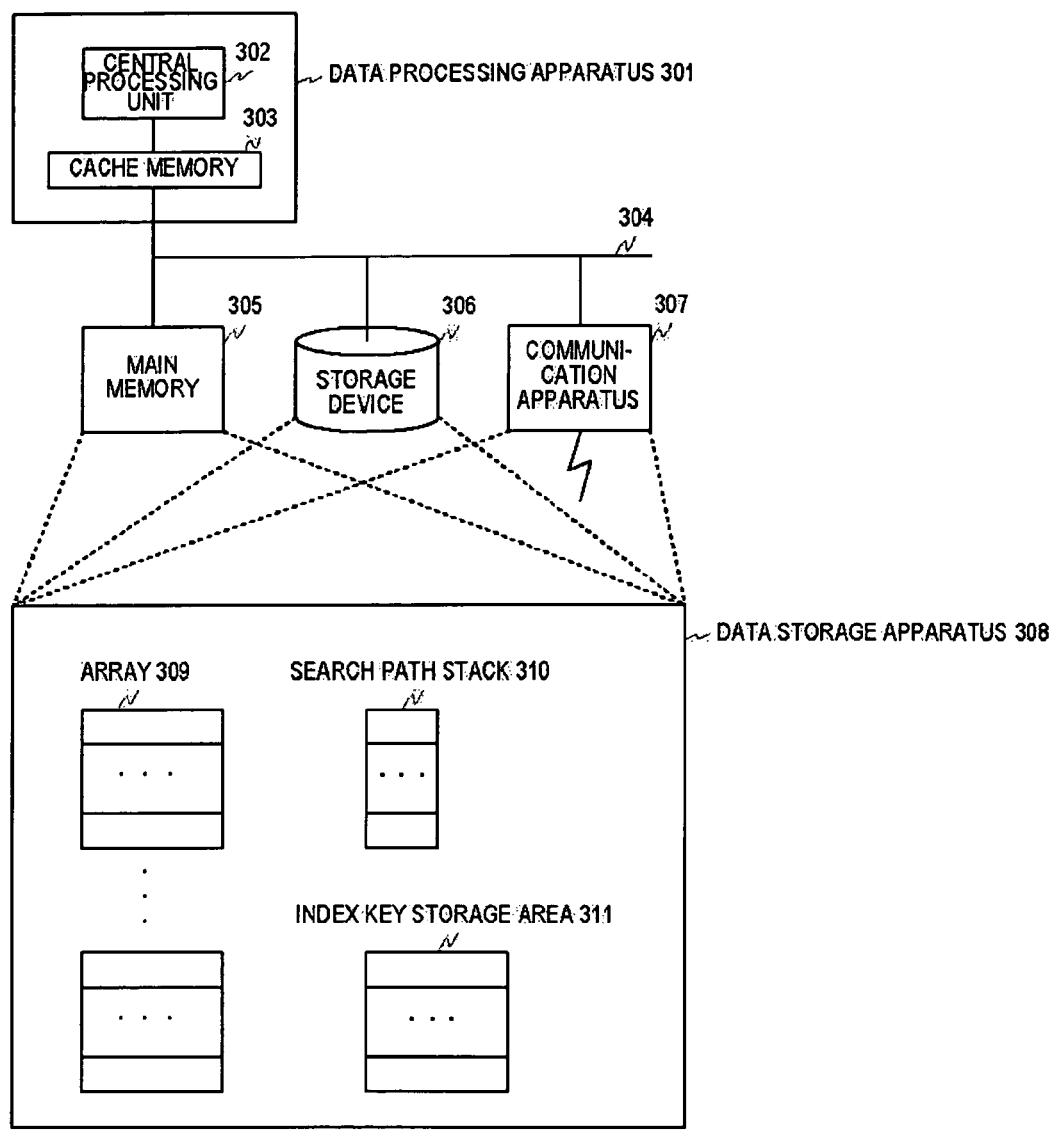
FIG. 3 is a drawing describing an exemplary hardware configuration for embodying the present invention according to a preferred embodiment of this invention.

FIG. 3 is a drawing describing an example of a hardware configuration for embodying the present invention.

Figure 1:
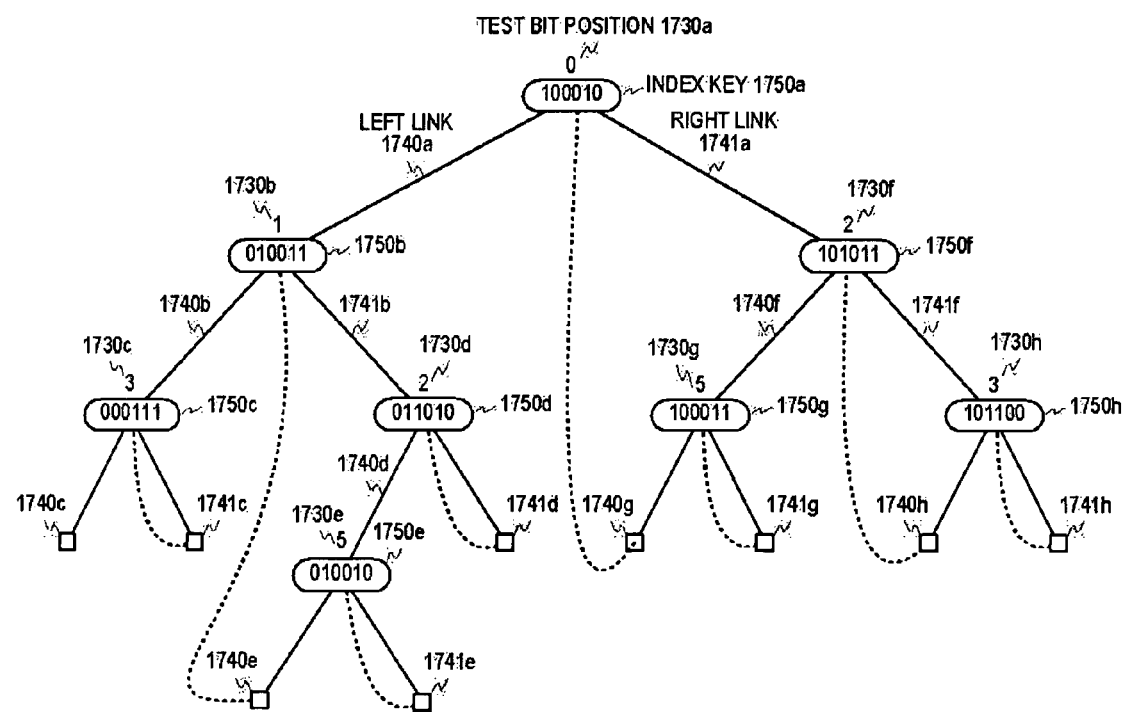
FIG. 1 is a drawing showing an example of a Patricia tree used in searching in the past.

Search processing and data maintenance are implemented with the searching apparatus of the present invention by a data processing apparatus 301 having at least a central processing unit 302 and a cache memory 303, and a data storage apparatus 308. The array 309 into which is disposed a coupled node tree, and the search path stack 310, into which are stored array element position numbers of nodes which are traversed during the search, can be implemented by a main memory 305 or a storage device 306, or alternatively, by using a remotely disposed apparatus connected via a communication apparatus 307. The array 100 in FIG. 1 is one exemplification of array 309. Also, just as in FIG. 2B, the index key storage area 311 is shown as a contiguous area but of course it may just as well be a noncontiguous area.

In the example shown in FIG. 3, although the main memory 305, the storage device 306, and the communication apparatus 307 are connected to the data processing apparatus 301 by a single bus 304, there is no restriction to this connection method. The main memory 305 can be disposed within the data processing apparatus 301, and can be implemented as hardware within the central processing unit 302. It will be understood that it is alternatively possible to select appropriate hardware elements in accordance with the usable hardware environment and the size of the index key set, for example, having the array 309 held in the storage device 306 and having the search path stack 310 held in the main memory 305.

Also, although it is not particularly illustrated, a temporary memory area can of course be used to enable various values obtained during processing to be used in subsequent processing.

As shown in FIG. 3, the array 309 comprising the array elements holding the nodes of the coupled node tree is a different area than that of the index key storage area 311. Thus compared with the case where index keys are included in the array elements holding leaf nodes, the configuration of FIG. 3 uses less storage area than the storage area normally needed for a single array. In other words, by separating the index key storage area 311 from the array 309 holding the coupled node tree, when the coupled node tree is read into the cache memory 303, the number of nodes in a single cache block can be increased. In this way, the number of cache misses in the search processing, etc., described later are reduced and processing can be made faster.

Hereinafter the basic operations used for a coupled node tree, which are search, insert, and delete, will be explained in detail in that order.

These operations are partially changed, in accordance with a change in the structure of the coupled node tree, from the search, insert, and delete operations in the previously cited patent applications.

Figure 4:
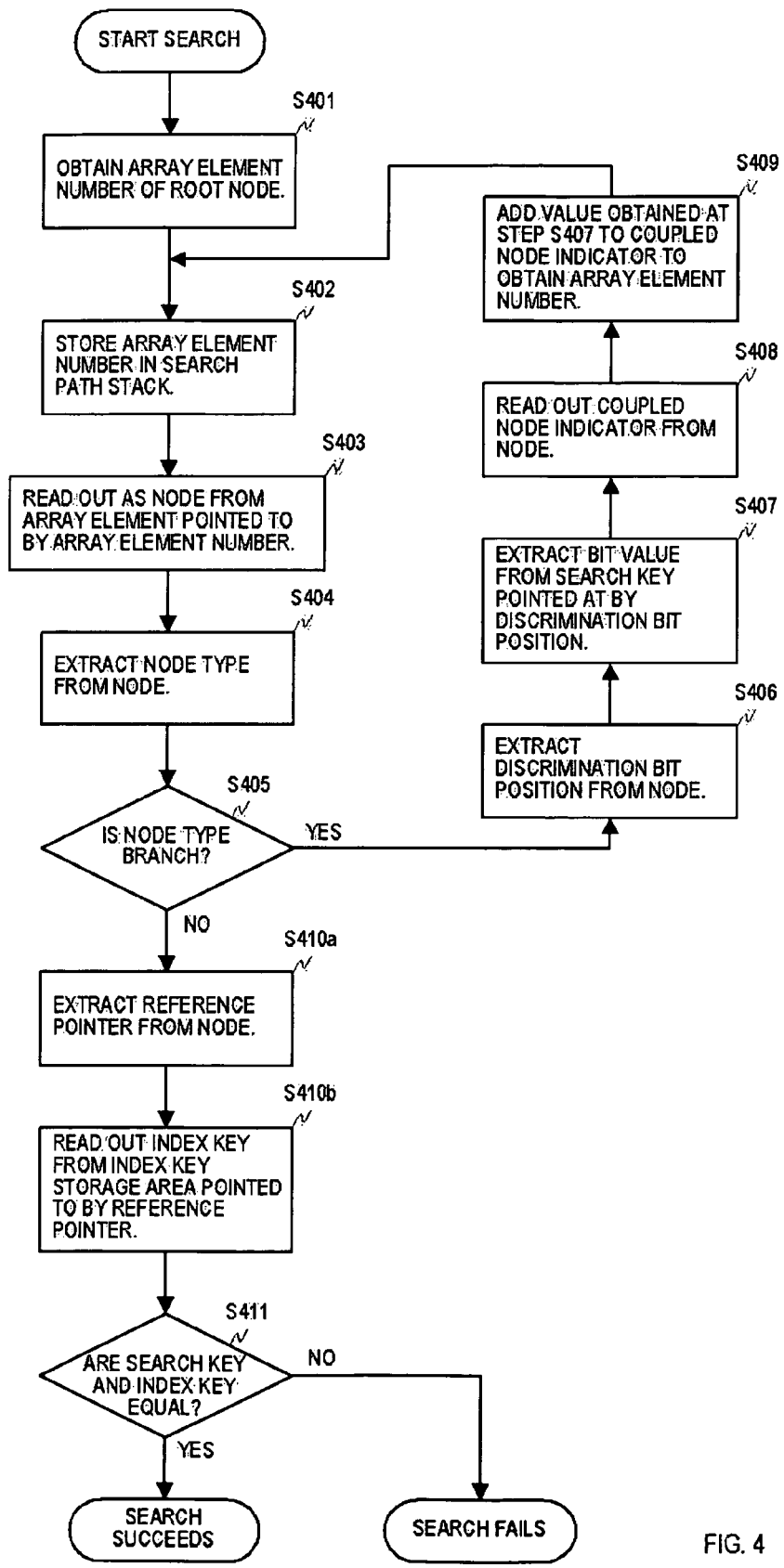
FIG. 4 is a flowchart showing the search process according to a preferred embodiment of this invention.

FIG. 4 is flowchart showing bit string search processing in one embodiment of this invention. First, in step S401 the array element number of the search start node is acquired. The array element corresponding to the array element number obtained is that of the root node.

Next, at step S402, the array element position number acquired is stored on the search path stack 310. Proceeding to step S403, the array element of the array element position number is read out as a node to be referenced. At step S404, the node type is extracted from the read out node.

Next at step S405, a determination is made as to whether the node type is a branch node or not.

If the determination made at step S405 is that the node type is a branch node, processing proceeds to step S406 and the discrimination bit position is extracted from the node and next at step S407, the bit value of the search key at the discrimination bit position extracted at step S406 is obtained from the search key. Next, in step S408, the coupled node indicator of the primary node of the node pair of the link target is read out from the node. Then, in step S409, the bit value obtained at step S407 is added to the coupled node indicator obtained at step S408, thereby obtaining the array element number of the link target node, and return is made to step S402.

Thereafter, the processing from step S402 to step S409 is repeated until the determination at step S405 is that the node is a leaf node and processing proceeds to step S410a. At step S410a, the reference pointer is extracted from the leaf node and proceeding to step S410b the index key pointed to by that reference pointer is read out from the index key storage area. Next, in step 411, a determination is made whether there is coincidence between the search key and the index key that was read out. If there is coincidence, the search succeeds, and if there is no coincidence, the search fails.

Although, in the flowchart of FIG. 4, the whole of the coupled node tree is the object of the search, it is clear from the above explanation that it is possible to make any arbitrary subtree of the coupled node tree as the object of the search.

In that case, it is sufficient to change the processing of FIG. 4 so that the array element number of the root node of the subtree that is the object of the search be obtained in step S401.

Since the root node of the subtree that is the object of the search will be specified by the application processing that invokes the search processing of FIG. 4, it is sufficient for step S401 to receive the array element number of the root node of the subtree that is the object of the search from the source of the invoking. The processing to obtain index keys in ascending order is one concrete example of such application processing as is shown in the above cited patent application 2006-293619.

The difference between the search processing of FIG. 4 and the search processing of the patent application 2006-293619 is that, in steps S410a and S410b, the index key is not directly referenced but rather indirectly referenced through the reference pointer.

As a result, besides referencing the node stored in array 309 in step S403 it is also necessary, in step S410b, to reference the index key stored in index key storage area 311, and the number of references to memory is only increased by 1.

Conversely, the more nodes there are in the coupled node tree and the deeper the tree, the ratio of the computational cost of reiterating the loop of steps S402 to S409 will increase with regard to the overall search processing computational cost, and the effect of reducing the computational cost of the reiteration of this loop will increase.

In other words in a search of a coupled node tree with many nodes, compared to the big advantage of higher speed by separating the index key storage area 311 from the array 309, the additional cost of indirect references is so small that it can be ignored.

Figure 5:
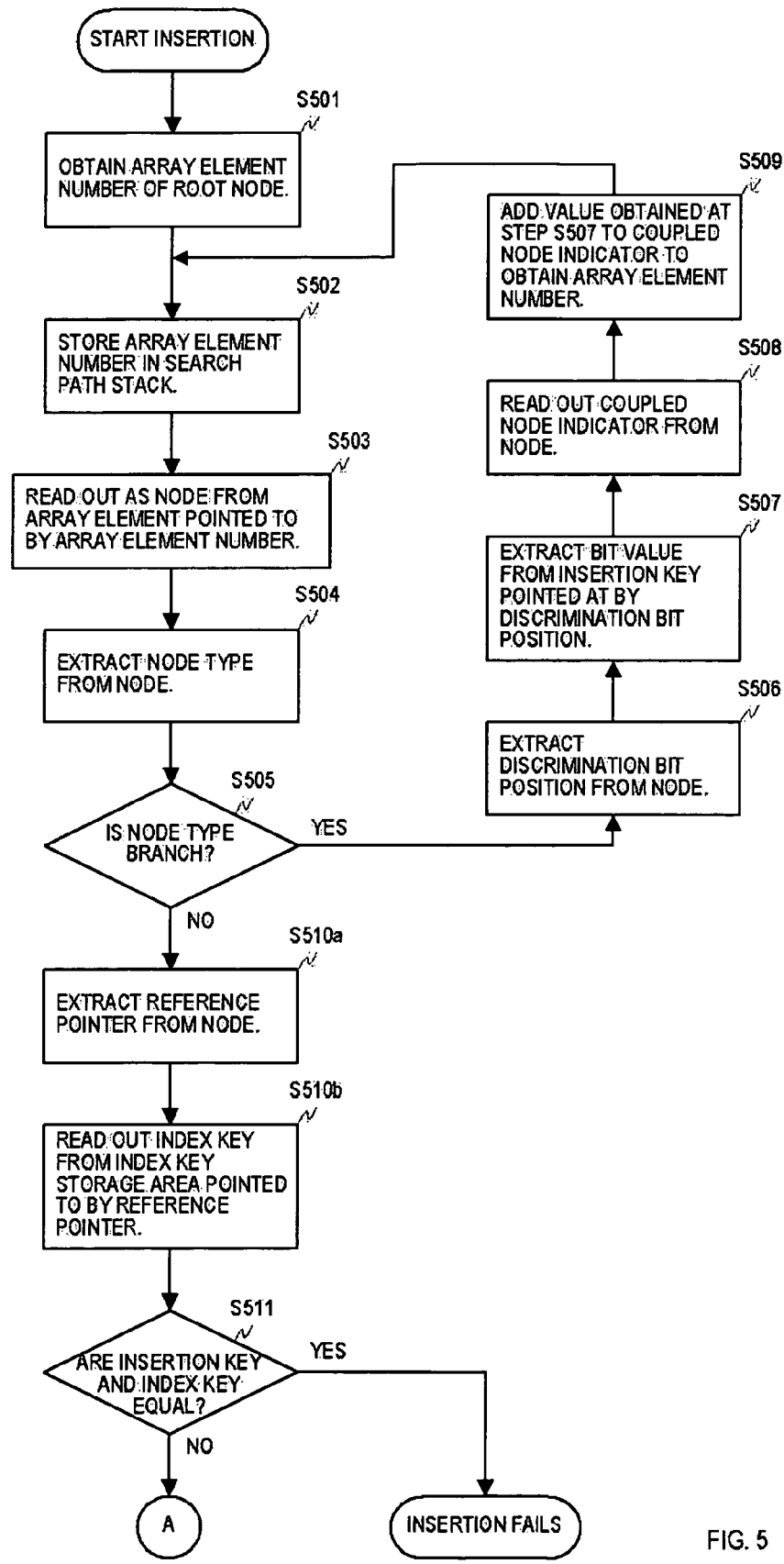
FIG. 5 is a drawing showing the flow of search processing, which is the first stage of the insertion processing according to a preferred embodiment of this invention.
Figure 6:
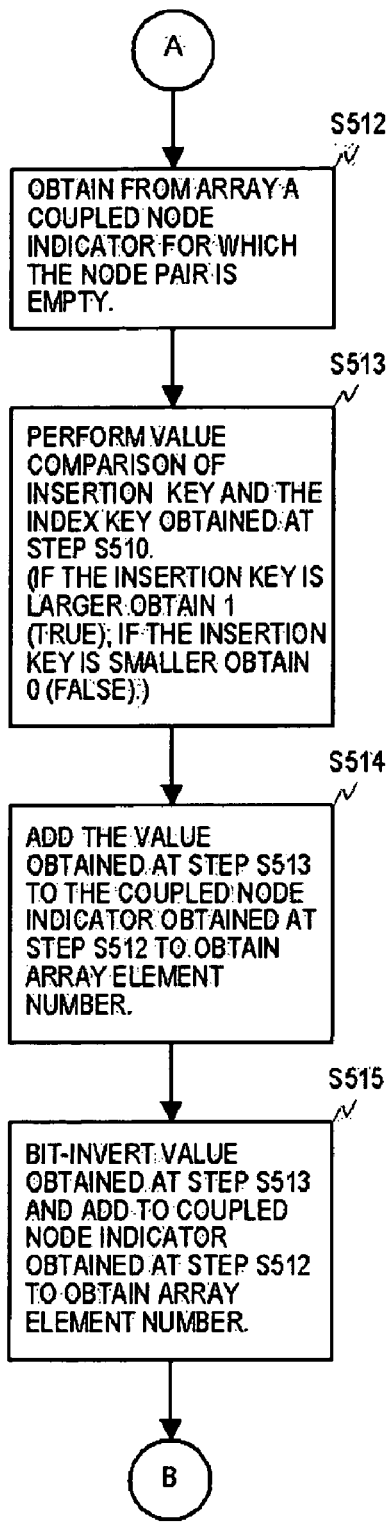
FIG. 6 is a drawing describing the processing flow for preparing array elements for a node pair to be inserted in insertion processing according to a preferred embodiment of this invention.
Figure 7:
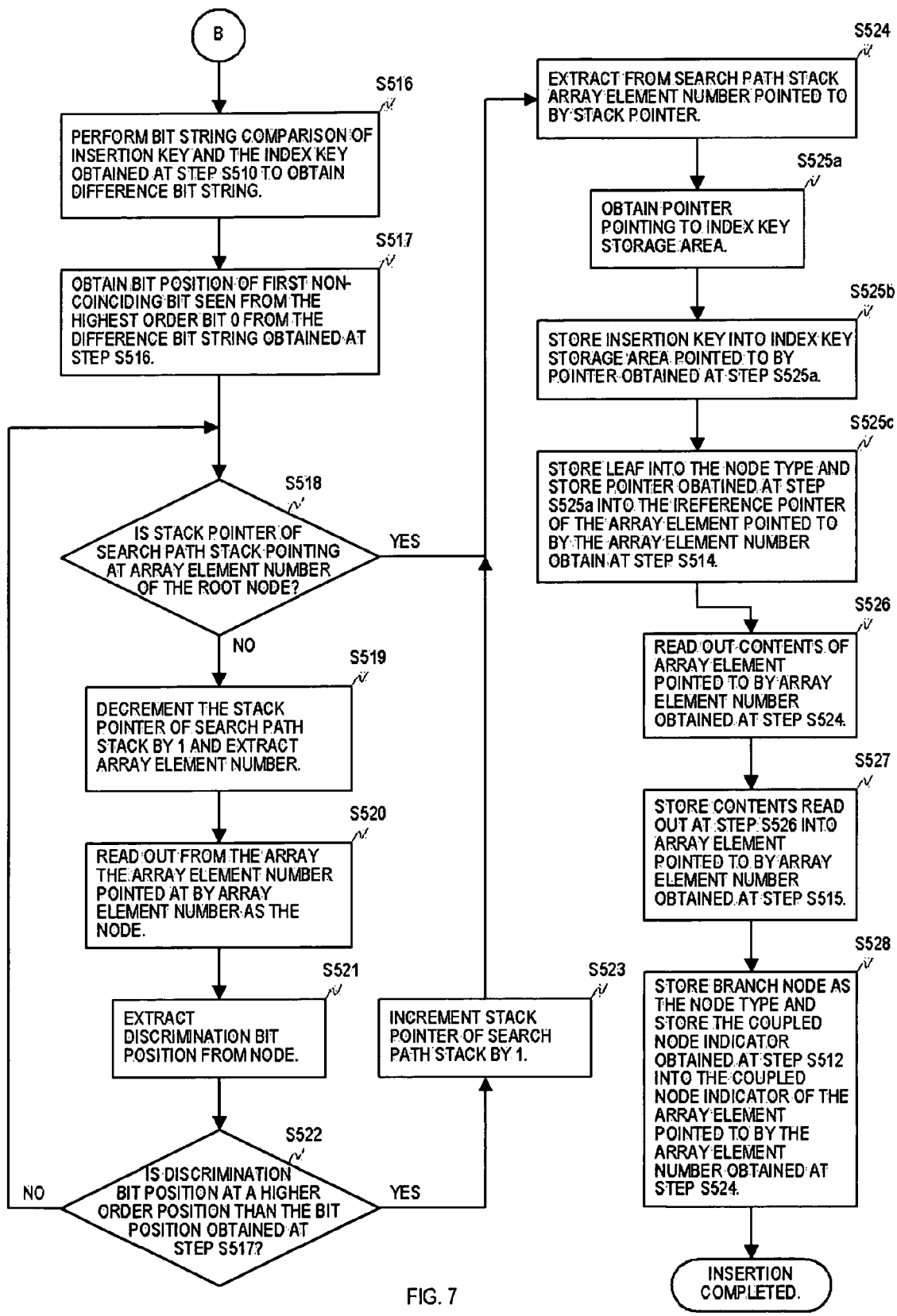
FIG. 7 is a drawing showing the processing flow for determining the position at which a node pair is to be inserted, and the storing of the content of each node of the node pair to complete the insertion processing, according to a preferred embodiment of this invention.

Next, FIG. 5 to FIG. 8 will be used to describe node insertion processing in a coupled node tree. FIG. 5 to FIG. 7 describe the usual insertion processing, and FIG. 8 describes the processing for insertion of a root node.

FIG. 5 is a drawing showing the processing flow of the search processing that is the first stage of insertion processing, and corresponds to the search processing shown in FIG. 4 using the insertion key as the search key. Because the processing of step S501 to step S510b corresponds completely to step S401 to step S410b of FIG. 4, these steps will not be described herein.

At step S511 in FIG. 5, a comparison is performed between the insertion key and the index key obtained in step S510b and, because if there is equality the insertion key already exists in the coupled node tree, the insertion fails, and processing ends. If, however, there is no equality, processing proceeds to step S512 and thereafter in FIG. 6.

FIG. 6 is a processing flowchart describing the processing to prepare an array element number for a node pair to be inserted.

At step S512, an empty node pair is obtained from the array, and the array element number of the array element to be made the primary node of the node pair is acquired.

Proceeding to step S513, a value comparison is performed between the insertion key and the index key acquired at step S510b and, if the insertion key is larger, the Boolean value 1 is obtained, but if the insertion key is smaller, the Boolean value 0 is obtained.

Proceeding to step S514, the Boolean value obtained at step S513 is added to the array element number of the primary node obtained at step S512 to obtain an array element number.

Proceeding to step S515, the logical negation value of the Boolean value obtained at step S513 is added to the array element number of the primary node obtained at step S512 to obtain an array element number.

The array element number obtained at step S514 is the array element number of the array element into which is stored a leaf node having the reference pointer for the storage area in which the insertion key is stored as an index key, and the array element number obtained at step S515 is the array element number of the array element into which a node that forms a pair with that leaf node is stored.

That is, by means of the value relationship between the index key stored in the leaf node obtained by the first stage of search processing and the insertion key, a determination is made of into what node of the node pair to be inserted the leaf node holding the reference pointer is to be stored.

For example, in the case in which "011011XXXXXXXX" is to be inserted into the coupled node tree of FIG. 2B, the index key resulting from the search is the "011010XXXXXXXX" that is stored in node 211d. A Boolean value is obtained by performing a value comparison between the insertion key "011011XXXXXXXX" and the index key "011010XXXXXXXX X" stored in the node 211d, and, in this example, because the insertion key is larger, the Boolean value 1 is obtained, so that the leaf node that holds the reference pointer pointing to the insertion key is stored in an array element having an array element number obtained by adding 1 to the couple node indicator of the node pair to be inserted. The reference pointer pointing to the index key "011010XXXXXXXX" is stored in an array element having an array element number obtained by adding the logical negation value of the Boolean value obtained by the value comparison to the coupled node indicator.

When this is done, because the index key "011010XXXXXXXX" and the insertion key "011011XXXXXXXX" differ at the 5th bit, the node 211d is a branch node, with a discrimination bit position of 5, of which coupled node indicator is the array element number of the primary node of the node pair which is inserted.

In the case also in which "011001XXXXXXXX" is to be inserted into the coupled node tree of FIG. 2B, the index key resulting from the search is "011010XXXXXXXX" that is stored in node 211d. In this case, because the insertion key is smaller, the Boolean value 0 is obtained, so that the leaf node that holds the reference pointer for the insertion key is stored in an array element having an array element number obtained by adding 0 to the coupled node indicator of the node pair to be inserted. Then, because the index key "011010XXXXXXXX" and the insertion key "011001XXXXXXXX" differ at the 4th bit, the node 211d is a branch node, with a discrimination bit position of 4, of which coupled node indicator is the array element number of the primary node of the node pair which is inserted.

Next processing proceeds to the processing in step S516 and thereafter in FIG. 7.

FIG. 7 is a drawing showing the processing flow of storing a node in the array prepared as shown in FIG. 6, determining the insertion position therein, and changing the contents of an existing node to complete the insertion processing.

The processing from step S516 to step S523 is processing to determine the position on the coupled node tree for insertion of a node pair, and the processing of step S524 and thereafter is processing for setting data in each node and completing the insertion processing.

At step S516, an exclusive-OR, for example, is obtained of the insertion key and the index key obtained at step S510 so as to obtain a difference bit string. Proceeding to step S517, from the difference bit string obtained at step S516 the first bit position starting from the most-significant 0th bit at which there is a non-coincidence is obtained. This processing can be performed by, for example, a CPU having a priority encoder, the difference bit string being input thereto and the non-coincidence bit position being obtained. It is alternatively possible to perform the equivalent processing using software, to obtain the first bit position at which there is non-coincidence.

Next, proceeding to step S518, a determination is made as to whether the stack pointer of the search path pointer is pointing at the array element number of the root node. If it is, processing proceeds to step S524, but if it is not, processing proceeds to step S519.

At step S519, the stack pointer of the search path stack is decremented by 1, and the array element number stacked at that point is extracted.

Proceeding to step S520, the array element for the array element number extracted in step S519 is read out from the array as a node.

Proceeding to step S521, the discrimination bit position is extracted from the node read out in step S520.

Next, proceeding to step S522, a judgment is made as to whether the discrimination bit position extracted at step S521 is of higher order than the bit position obtained at step S517. In this case, the term higher order means more to the left in the bit string, that is, having a lower bit position value.

If the result of the judgment at step S522 is negative, return is made to step S518, and repetition is done until either the judgment at step S518 is affirmative or the judgment at step S522 is affirmative. When an affirmative judgment results at step S522, at step S523 the stack pointer search path stack is incremented by 1, and processing proceeds to the processing of step S524 and thereafter.

In the above-described processing at step S516 to step S523, in order to determine the position of insertion of a node pair, a bit string comparison is performed between the index key that is to be inserted and index key obtained by searching, and then a check is made of the relative positional relationship between the leading (most significant) bit position at which the bit value is different in the bit string comparison and the discrimination bit position of branch nodes whose array element numbers are stored in the search path stack. The next branch node link target of the branch node at which the discrimination bit position is more significant is made the insertion position for the node pair to be inserted.

For example, when inserting "111000XXXXXXXX" into the coupled node tree of FIG. 2B, the index key resulting from the search is the "101011XXXXXXXX" stored in the node 210h. A bit string comparison between the insertion key "111000XXXXXXXX" and the index key "101011XXXXXXXX" stored in the node 210h obtains the bit position 1 as the most significant bit position of a bit value that is different. The search path stack is successively traversed in reverse until the relative position relationship between the obtained bit position 1 and the discrimination bit position of a branch node stored in the array element having an array element number stored in the search path stack is such that the discrimination bit position is more significant, so that the root node 210a is reached. At that point the search path stack pointer is incremented by 1 to obtain the array element number of the node 211b. The insertion key "111000XXXXXXXX" is inserted into the link target of the node 211b.

If the root node is reached by traversing the search path stack in reverse but the discrimination bit position of the root node is not a bit position that is more significant than the bit position of the most significant bit having a different bit value in the previously determined bit string comparison, this is the case in which at the upper-order bit of the index key of the coupled node tree the bits that are more significant than the discrimination bit position of the root node all have equal values. This means that in the index key to be inserted, there is the first bit value that differs with the value of a bit that is more significant that the discrimination bit position of the root node. Therefore, the node pair to be inserted becomes the direct link target of the root node, and the discrimination bit position of the root node changes to the position of the most significant bit of the insertion key, which differs in value from the existing index key.

Next, the processing of step S524 and thereafter, which is the processing to set data at each node and complete the insertion processing, will be described. At step S524, the array element number that is pointed to by the stack pointer of the search path stack is extracted.

Following on step S524 and proceeding to step S525a, a storage area for storing the insertion key is allocated from the index key storage area and a pointer pointing to the storage area allocated is obtained. Next in step S525b the insertion key is written to the index key storage area pointed to by the pointer obtained in step S525a.

Proceeding to step S525c, "1", indicating leaf node, is stored in the node type of the array element pointed to by the array element number obtained at step S514 and the pointer obtained in step S525b is stored in the reference pointer.

Proceeding to step S526, the array element at the array element number obtained at step S524 is read out from the array.

Next, at step S527, the contents read out at step S526 are stored in the array element having the array element number obtained at step S515.

Finally, at step S528, 0 (branch node) is stored in the node type of the array element pointed to by the array element number obtained in step S524, the bit position obtained at step S517 is stored in the discrimination bit position, and the array element number obtained at the step S512 is stored in the coupled node indicator and processing is terminated.

In the above-described example of inserting "111000XXXXXXXX" into the coupled node tree of FIG. 2, in step S525c, the reference pointer pointing to the insertion key "111000XXXXXXXX" is written, as a leaf node, into node [1] of the empty node pair that is obtained, and in step S527, the contents of node 211b are written into the node [0] thereof. Then in step S528 the bit position of the most significant bit "1" that is the first bit value that differs in the bit string comparison is stored in the discrimination bit position of the node 211b, and the array element number of the array element in which the primary node of the obtained node pair is stored is stored into the coupled node indicator of the node 211b.

Figure 8:
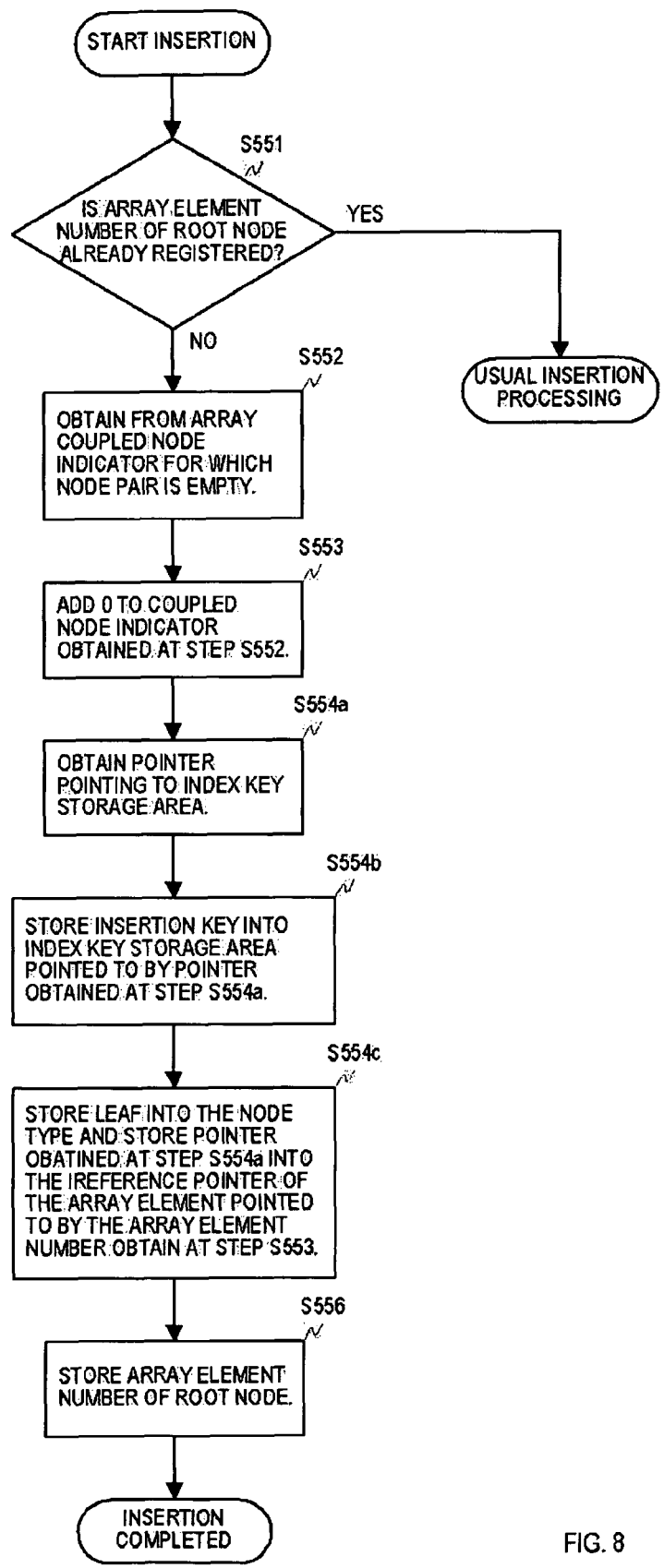
FIG. 8 is a drawing describing the overall node insertion processing flow for a case in which an index key is added, including root node insertion processing, according to a preferred embodiment of this invention.

FIG. 8 is a drawing describing the processing flow for the overall insertion processing of a leaf node, including the insertion processing of a root node, in one embodiment of this invention.

At step S551, a judgment is made as to whether the array element number of a root node of a coupled node tree that is to be obtained as already been registered. If it has already been registered, the usual insertion processing described using FIG. 5 to FIG. 7 is performed.

At step S551, if the judgment is that the registration has not yet been done, this is the case of the generation and registration of a completely new coupled node tree.

First, at step S552, an empty node pair is requested from the array, and the array element number of the array element to be made the primary node of the node pair is obtained. Next at step S553, the array element number is determined by adding 0 to the array element number obtained at step S552. (In actuality, this is equal to the array element number obtained at step S552). Next, at step S554a, a storage area necessary for storing the insertion key is allocated from the index key storage area and a pointer pointing to the storage area allocated is obtained. Then in step S554b the insertion key is written into the storage area pointed to by the pointer obtained in step S554a.

Further, in step S554c, "1" which indicates leaf node is written in the node type of the array element of the array element number obtained in step S553, that is, the array element corresponding to the root node, and the pointer obtained in step S554a is written in the reference pointer. Then in step S556 the processing is completed by registering the array element number of the root node obtained at step S552.

As described above, it will be understood that when there is a set of index keys, the index keys are successively extracted therefrom, and the processing of FIG. 8 and FIG. 5A to FIG. 7 is repeated so as to enable the creation of a coupled node tree corresponding to the set of index keys according to the present invention.

The difference between the insertion processing in the previously cited patent application by this applicant and the insertion processing of FIG. 5 to FIG. 8 is whether the insertion key is written into the array 309 or the insertion key is written into the index key storage area 311 and the reference pointer written into the array 309.

By this difference, this application has an advantage over the previously cited patent application in that storage space can be used more efficiently. In step S525a of FIG. 7 and step S554a of FIG. 8 it is sufficient to allocate the smallest possible storage area corresponding to the length of the index key to be inserted. Even if long index keys are used, useless empty areas for the array elements in array 309 do not largely exist. And since the index key storage area 311 is separated from the array 309, there is also the advantage that the length of the index keys need not be ascertained beforehand.

Conversely, because of this difference, although the number of steps increases compared to the previously cited patent application, the added steps are steps S525a and S525b of FIG. 7 and steps S554a and S554b of FIG. 8 and only 2 simple steps are added once to each insertion process. In other words there is only a small additional computational cost to insertion processing and it is practically ignorable compared to the advantages.

Next, referring to FIG. 9 and FIG. 10, the processing flow for deleting a leaf node corresponding to a specific index key from a coupled node tree in an embodiment of the present invention will be described.

Figure 9:
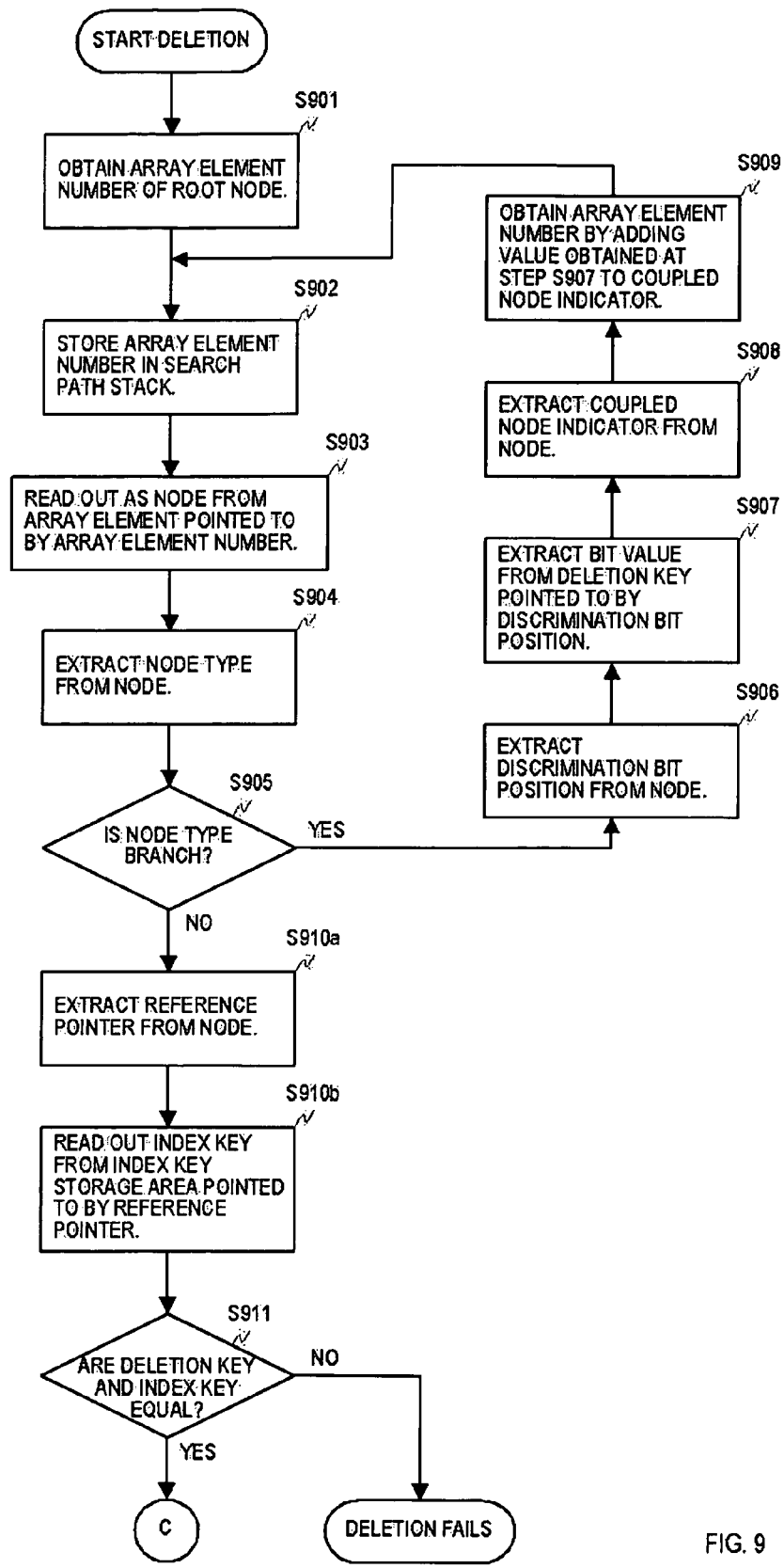
FIG. 9 is a flowchart showing the search processing flow, which is the first stage of deletion processing according to a preferred embodiment of this invention.

FIG. 9 is a drawing showing the processing flow for search processing, which is the first stage of deletion processing, this corresponding to using a deletion key as the search key in the searching processing shown in FIG. 4.

Since the process of step S901 to step S910b corresponds completely with that of step S401 to step S410b of FIG. 4, their description is omitted.

In step S911 in FIG. 9, a comparison is performed between the deletion key and the index key obtained in step S910b and, because if there is no equality the index key to be deleted does not exist in the coupled node tree, the deletion fails, and processing ends. If, however, there is equality, processing proceeds to step S912 and thereafter in FIG. 10.

Figure 10:
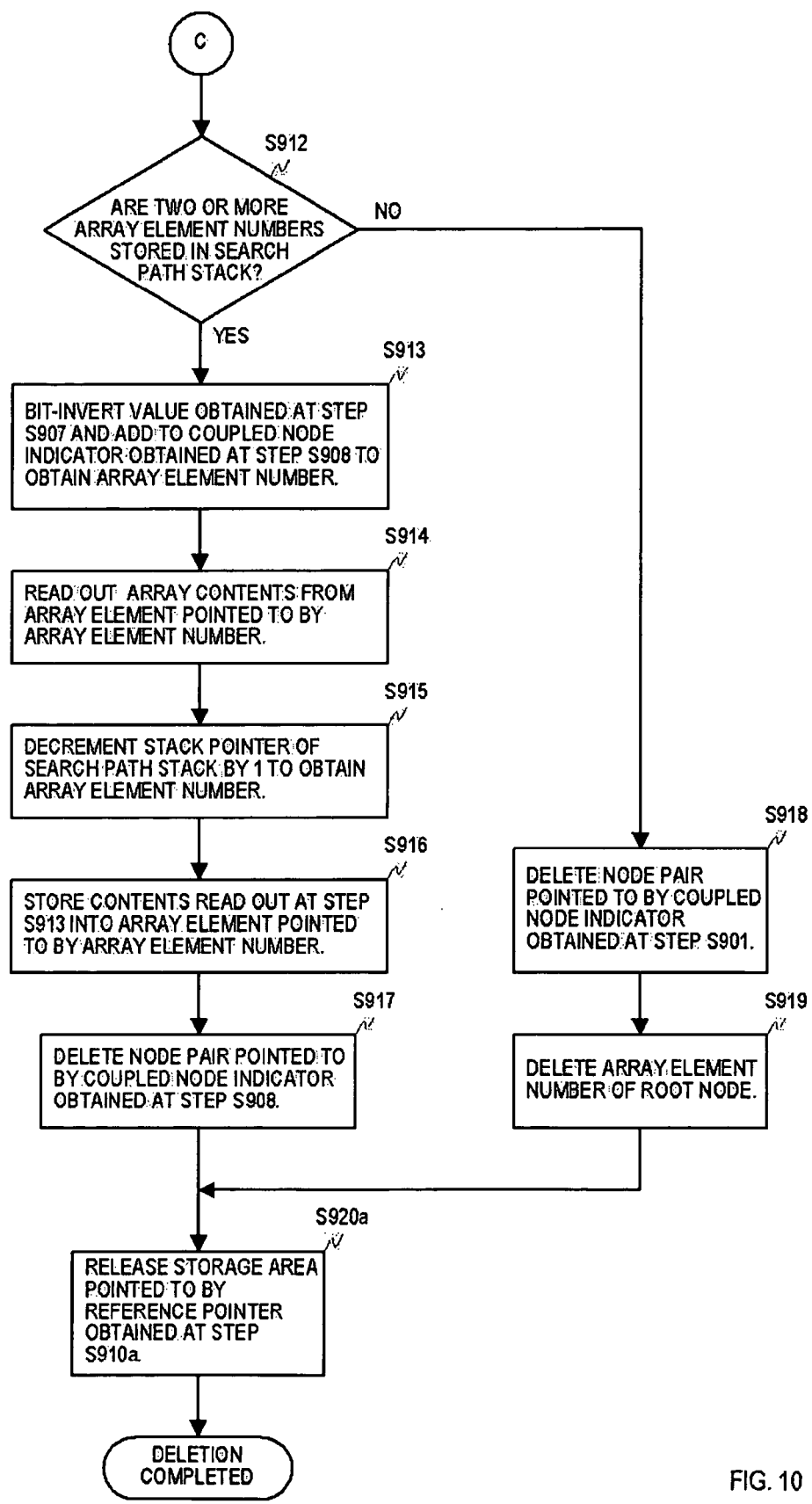
FIG. 10 is a drawing describing the processing flow that is the latter stage of the deletion processing according to a preferred embodiment of this invention.

FIG. 10 is a drawing describing the processing flow of the latter stage of the deletion processing.

First, at step S912, a judgment is made as to whether or not there are at least 2 array element numbers on the search path stack. Stated differently, the condition in which there are fewer than 2 array element numbers is the one in which there is only 1, this being the array element number of the array element in which the root node is stored. In this case, processing proceeds to step S918, at which the node pair of the array element number of the root node obtained at step S901 is deleted. Next, proceeding to step S920a, the storage area in which is stored the index key that matches the deletion key, that is, the storage area pointed to by the reference pointer obtained in step S910a, is released, thereby completing the processing.

When at step S912 the judgment is made that there are two or more array element numbers stored in the search path stack, processing proceeds to step S913, at which an array element number is obtained by adding the inversion of the value obtained at step S907 is added to the coupled node indicator obtained at step S908. This processing is performed to determine the array element number of a node which forms a pair with a leaf node at which is stored the index key to be deleted.

Next, at step S914, the contents of the array element having the array element number obtained at step S913 are read out, and at step S915 the stack pointer of the search path stack is decremented by 1 and the array element number is extracted.

Next, at step S916, the contents of the array element read out at step S914 are written over the array element having the array element number obtained at step S915. This processing replaces the branch node that is the link source to the leaf node in which the index key to be deleted is stored with the above-noted node that forms a pair with the leaf node.

Next in step S917, the node pair related to the coupled node indicator obtained in step S908 is deleted.

Finally, at step S920a, the storage area pointed to by the reference pointer obtained in step S910a is released and processing is terminated.

The difference between the deletion processing in the previously cited patent application by this applicant and the deletion processing of FIG. 9 to FIG. 10 is whether only the array 309 is subject to processing or whether the index key storage area 311 is also subject to processing.

Because of this difference, since an indirect reference becomes necessary in step S910b and step S920a is added, there is an increase in the number of steps in FIG. 9 to FIG. 10 compared with the deletion processing in the previously cited patent application. But the advantages cited above are more significant than the increased computational cost.

Figure 11A:
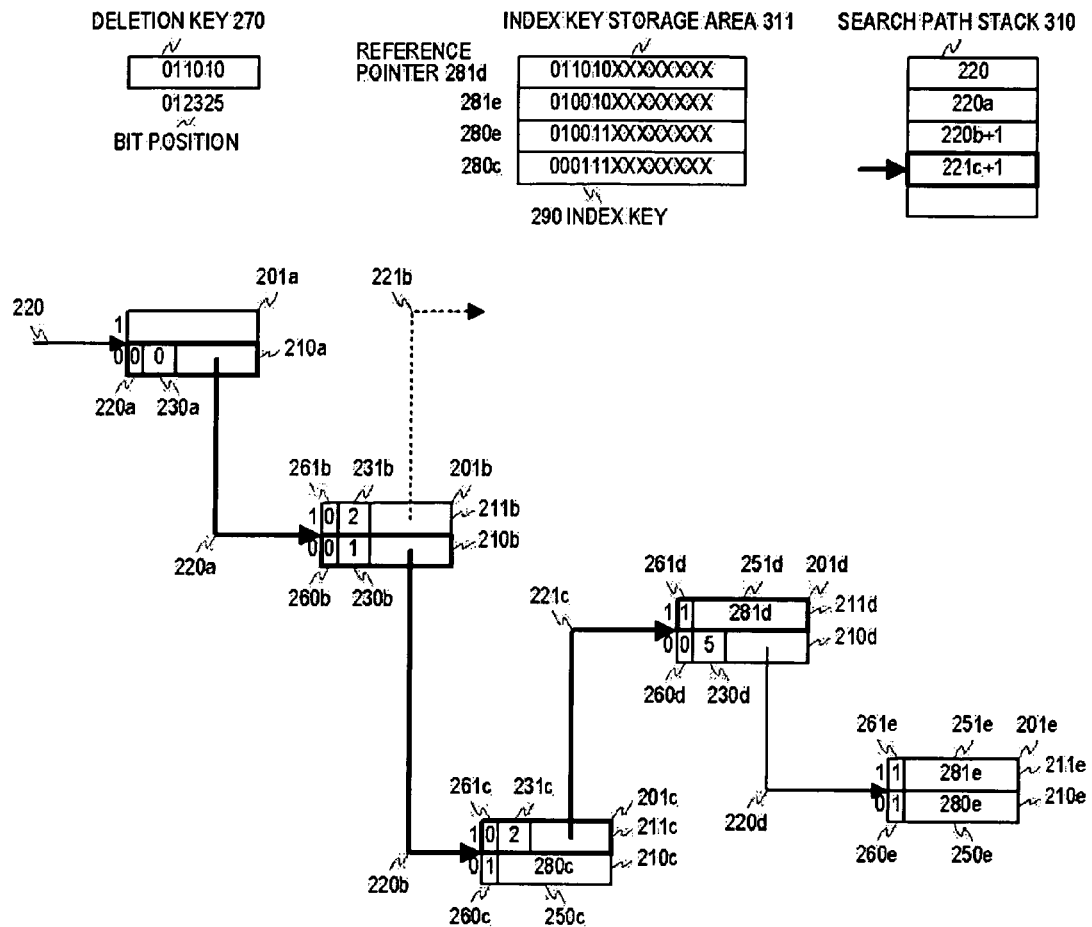
FIG. 11A is a drawing describing the coupled node tree before delete processing and the delete key "011010", according to a preferred embodiment of this invention.
Figure 11B:
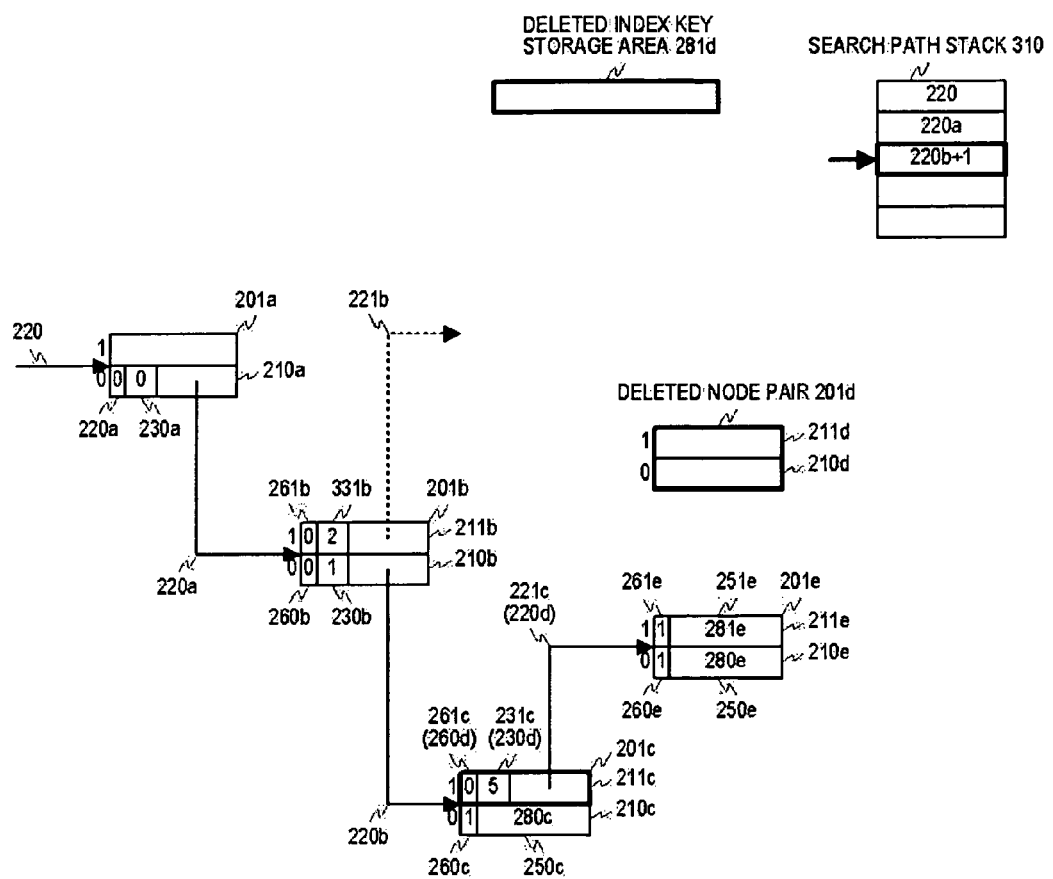
FIG. 11B is a drawing describing the coupled node tree after delete processing according to a preferred embodiment of this invention.

FIG. 11A and FIG. 11B are drawings explaining an embodiment of the deletion processing with "011010" as the deletion key using the coupled node tree embodiment exemplified in FIG. 2B.

A description of the nodes of node pairs 201f and below is omitted in the coupled node tree shown in FIG. 11A. The index key "011010" that is to be deleted is stored in the deletion key temporary storage area 270. The stack pointer of the search path stack points to the array element number 221c+1 and indicates that the search process in complete.

The nodes enclosed with a thick line are the nodes traversed during the search process and their array element numbers from the root node 210a to the leaf node 211d are stacked in the search path stack 310.

Also, although the index key 291d corresponding to node 211d is described as "011010XXXXXXXX", in order to simplify the explanation, the examples of FIG. 11A and FIG. 11B describe the case where no bits exist in the "XXXXXXXX" part of index key 291d and "011010XXXXXXXX" coincides with "011010". Also the index keys 291d, 291e, 290e, and 290c shown in FIG. 2B are collectively encoded in FIG. 11A as 290.

In the search processing using a delete key, first the array element number 220 of the root node 210a is obtained and is stored in the search path stack 310. Since the discrimination bit position 230a of the root node 210a is "0" and the bit value at the 0th bit position in the deletion key is "0", the primary node indicator 220a+0 (=220a) is stored in the search path stack 310.

Then node 210b is read out and since the discrimination bit position 230b is "1" and the bit value at the 1th bit position in the deletion key is "1" the primary node indicator 220b+1 is stored in the search path stack 310.

Next node 211c is read out and since the discrimination bit position 231c is "2" and the bit value at the 2th bit position in the deletion key is "1" the primary node indicator 221c+1 is stored in the search path stack 310. The node type 261d of node 211d stored in the array element with the array element number 221c is "1" and indicates that the node is a leaf node. The index key 291d corresponding to this leaf node is stored in the storage area referenced by the reference pointer 281d.

This storage area is one part of the index key storage area 311. Then when the index key 291d referenced by the reference pointer 281d is obtained, its value is "011010" and matches the index key subject to deletion that is stored in deletion key 270.

The contents of node 210d that forms a pair with node 211d that corresponds to the index key subject to deletion are read out and, after the stack pointer has been decremented by 1, are written to the array element (node 211c) of the array element number stored in the search path stack. Next the node pair 201d is deleted and the storage area wherein index key 291d is stored is released. The array elements for the node pair that is deleted are empty and can be reused. Also the index key storage area that is released can also be reused.

FIG. 11B shows the coupled node tree after deletion processing has been completed. As shown in the brackets, the values that were stored in node 210d have been stored in the node type 261c, the discrimination bit position 231c, and the primary node indicator 221c of node 211c.

Figure 12A:
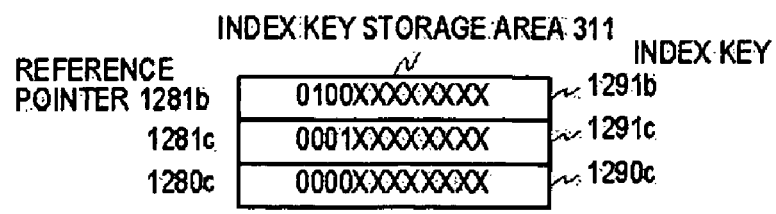
FIG. 12A is a drawing describing the coupled node tree before insertion processing and the insertion key "0011" according to a preferred embodiment of this invention.
Figure 12A:
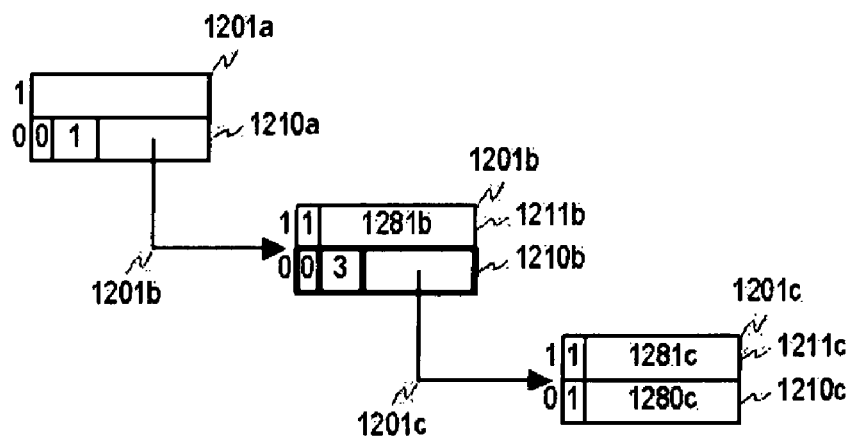
Figure 12B:
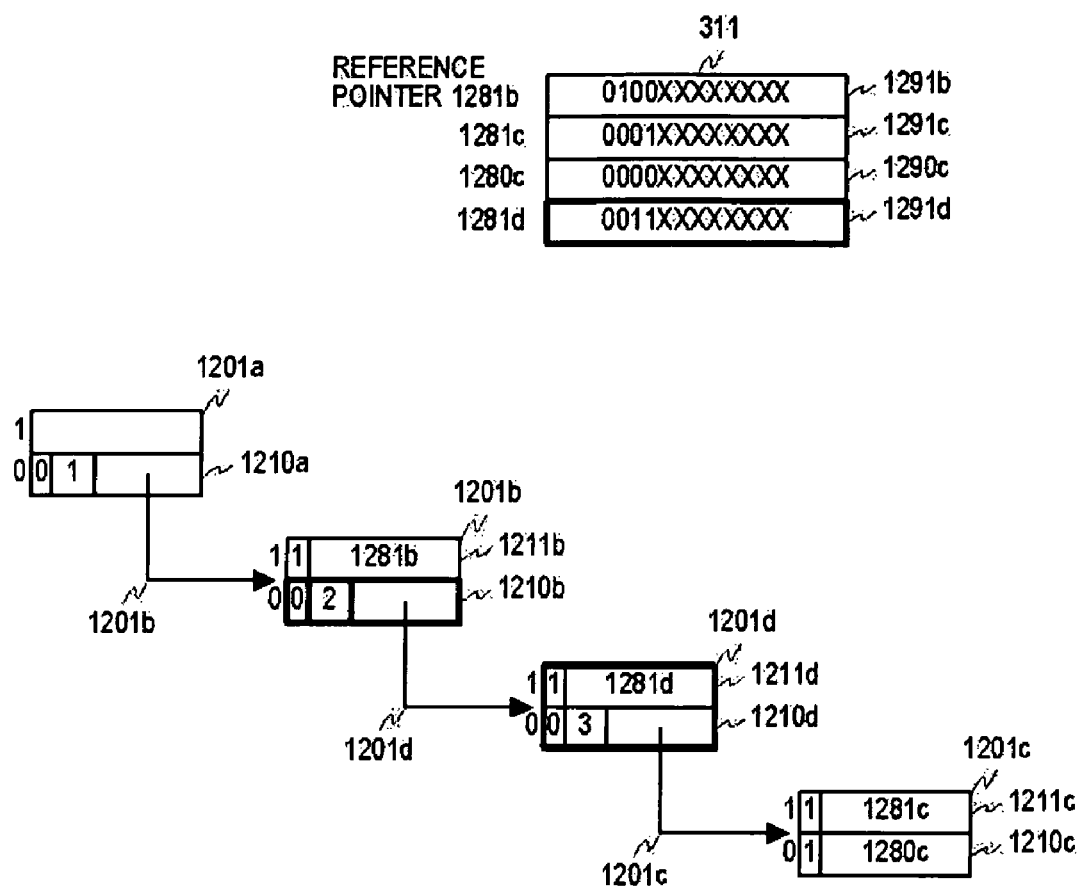
FIG. 12B is a drawing describing the coupled node tree after insertion processing according to a preferred embodiment of this invention.

Next, a concrete example of insertion processing, referencing FIG. 12A and FIG. 12B is described.

FIG. 12A shows a coupled node tree having reference pointers referencing the bit strings "0100XXXXXXXX", "0001XXXXXXXX", and "0000XXXXXXXX" as index keys. The insert key is "0011XXXXXXXX". The tree illustrated is configured of node pairs 1201*a*, 1201*b*, and 1201*c*.

The primary node of the node pair 1201*a* is the root node 1210*a* and it holds a "1" in the discrimination bit position. The primary node 1210*b* of the node pair 1201*b* below the node pair 1201*a* is a branch node, and it holds a "3" in the discrimination bit position. The node 1211*b* that is a pair to the primary node 1210*b* is a leaf node and holds the reference pointer 1281*b* that references the index key 1291*b* "0100XXXXXXXX". The node 1210*b*, which is a branch node, links to the node pair 1201*c*.

Both of the nodes 1210*c* and 1211*c* configuring node pair 1201*c* are leaf nodes and hold the reference pointers 1280*c* and 1281*c* pointing to the index key 1290*c* "0000XXXXXXXX" and the index key 1291*c* "0001XXXXXXXX" respectively.

FIG. 12B is a drawing showing the coupled node tree in which the insertion key "0011XXXXXXXX" is inserted. A new node pair 1201*d* is inserted between the node pair 1201*b* and the node pair 1201*c*.

When FIG. 12A and FIG. 12B are compared, the contents of the inserted node 1210*d* is that of node 1210*b* before the insertion and the discrimination bit positions in node 1210*b* after the insertion changes from 3 to 2.

Although the foregoing is a detailed description of a preferred embodiment of the present invention, the embodiments of the present invention are not limited in this manner, and it will be clear to a person skilled in the art that a variety of modifications thereof are possible.

It is also clear that the apparatus that executes the bit string search method of the present invention can be implemented on a computer by means of a program that executes on that computer the means for storing the coupled node tree and the processing shown in FIG. 4.

It is clear that the insertion method of this invention can be implemented by a program that a computer is caused to execute, which performs the insertion processing shown in FIG. 8 and FIG. 5 to FIG. 7 and its equivalents, and that the deletion method of this invention can be implemented by a program that a computer is caused to execute, which performs the deletion processing shown in FIG. 9 and FIG. 10 and its equivalents.

And, by those programs, the means of distinguishing branch nodes and leaf nodes, the means of linking to one of the nodes of a node pair which is the link target corresponding to the discrimination bit position of a branch node, etc. can be implemented on a computer.

Therefore, the above-noted programs, and a computer-readable storage medium into which the programs are stored are encompassed by the embodiments of the present invention. Also the data structures of the coupled node tree of this invention are also encompassed by the embodiments of the present invention.

As was explained in the details above, when using the new data structure of the coupled node tree provided by this invention, storage area can be used more efficiently and high speed bit string searches are enabled and the addition and deletion of bit string data can be easily executed.

What is claimed is:

1. A bit string search apparatus for searching for index keys, a tree data structure holding position information of the index keys, the position information being bit strings that are the object of searches by a search key, the search key being a bit string, the apparatus comprising:
   (A) a tangible non-transitory computer readable data storage apparatus having a coupled node tree stored therein, a root node being the starting point of the coupled node tree, the coupled node tree including node pairs arranged in adjacent areas of storage in the data storage apparatus, each of the node pairs having a primary node and a non-primary node that are configurational elements of the coupled node tree, the primary and non-primary nodes each having an area that holds the node type, the node type indicating the node being a branch node or a leaf node,
   the branch node having an area that holds the node type, an area that holds a discrimination bit position of the search key, and an area that holds a first position information that indicates a position of the primary node that is a link target not having an area holding a second position information indicating a position of a storage area in which is stored an index key composed of a bit string that is an object of the searches, and
   the leaf node having an area that holds the node type, and an area that holds the second position information but having neither an area that holds a discrimination bit position of the search key nor an area holding the first position information indicating the position of the primary node of the node pair that is the link target,
   (B) a data processing apparatus configured to execute the steps (a)-(f) of:
      (a) obtaining position information that indicates a position of a search start node to be read out, the search start node being a node of in one of the node pairs;
      (b) reading out the node type from the area that holds the node type of the node and determining whether the node type indicates a leaf node or a branch node;
      (c) reading out the index key from the storage area indicated by the second position information held in the leaf node;
      (d) reading out the first position information and the discrimination bit position from the branch node;
      (e) performing a calculation to obtain position information that indicates a node position for one of the nodes in the node pair, the calculation using a bit value in the search key for the discrimination bit position and using the first position information; and
      (f) reading out the node stored in a storage area as the link target node, using the position information obtained at step (e),
   wherein if the data processing apparatus determines the node type for the search start node to be the branch node at the step (b), the data processing apparatus is configured to repeat the steps (b), (d)-(f) until the leaf node is indicated as the node type,
   wherein if the data processing apparatus determines the node type for the search start node to be the leaf node at the step (b), the data processing apparatus is configured to perform step (c),
   wherein the index key obtained at the step (c) is a search result key for a subtree of the coupled node tree, the search start node being a root node of the subtree.

2. A bit string search apparatus according to claim 1, wherein
   the coupled node tree is stored in an array and the first position information is an array element number for an array element of the array in which the primary node is stored, and
   the array element number of an array element in which the search start node is stored and the array element numbers of array elements in which are stored the link target nodes from the search start node up until the leaf node are successively stored in a stack.

3. An index key insertion method using the bit string search apparatus according to claim 2, wherein the bit string search apparatus inserts the leaf node into the coupled node tree, the leaf node that is inserted into the coupled node tree holding position information that indicates a position of an insertion key, the insertion key being composed of a bit string as position information indicating a position of an index key, the method comprising:

a search step of reading out the node type from the root node and determining whether the node type from the root node indicates the leaf node or the branch node, the insertion key being used as the search key,
  (i) if the node type read out from the root node indicates the branch node, the node type is read out from the link target node until the link target node is determined to be the leaf node, the index key is read out from the storage area indicated by the second position information held in the link target node,
  (ii) if the node type read out from the root node indicates the leaf node, the index key is read out from the storage area indicated by the second position information held in the root node;
a comparison step of performing a value comparison and bit string comparison between the index key read out in the search step and the insertion key;
an empty node pair obtaining step of obtaining an empty array element pair from the array, storing the empty array element pair to a node pair, and obtaining an array element number of one array element of the empty array element pair;
a leaf node storage position decision step of using the value comparison to decide the empty array element from the empty array element pair that is to be the leaf node holding the second position information indicating the position of a storage area in which the insertion key is stored;
a node pair insertion position decision step of:
  (iii) reading out an array element number stored in a stack by the relative positional relationship between the bit position of a first differing bit found in the bit string comparison in the comparison step and the discrimination bit position of the branch node stored in the array element with the array element number stored in the stack, and
  (iv) deciding the node stored in the array element with that array element number to be the insertion position as the link origin of the node pair to be stored in the empty array element pair obtained in the empty node obtaining step;
an insertion node pair generating step of:
  (v) generating an insertion node pair by writing the node type indicating a leaf node into the area that holds the node type of the leaf node arranged in the empty array element that is decided in node pair insertion position decision step and writing the second position information indicating the position of the storage area in which the insertion key is stored into the area holding the second position information indicating the position of the index key, and
  (vi) reading out the contents of the node stored in the array element with the array element number read out from the stack in the node pair insertion position decision step and writing the contents into the other array element of the empty array element pair; and
a branch node generating step of:
  (vii) making the node stored in the array element with the array element number read out in the node pair insertion position decision step into a branch node by writing the node type indicating a branch node into the area holding the node type,
  (viii) writing the bit position of the first differing bit found in the bit string comparison in the comparison step into the area holding the discrimination bit position, and
  (ix) writing the array element number obtained in the empty node pair obtaining step into the area holding the array element number of the array element in the array which holds a primary node of the node pair that is the link target,
wherein the array element numbers of the array elements stored in the branch nodes and leaf node in the link path traversed until the leaf node are successively being stored in the stack.

4. A tangible non-transitory computer readable medium that holds a program that a computer is caused to execute, for performing the index key insertion method according to claim 3.

5. An index key insertion method using the bit string search apparatus according to claim 2, wherein the bit string search apparatus deletes a leaf node holding a position information indicating a position of an index key that coincides with the desired deletion key composed of a bit string from the coupled node tree, the method comprising:

a search step of reading out the root node and a determining the node type of the root node, the deletion key being used as the search key,
  (i) if the node type read out from the root node indicates the branch node, the node type is read out from the link target node until the link target node is determined to be the leaf node, the index key is read out from the storage area indicated by the second position information held in the link target node,
  (ii) if the node type read out from the root node indicates the leaf node, the index key is read out from the storage area indicated by the second position information held in the root node;
a node read-out step to be performed when the index key read out in the search step coincides with the deletion key, contents of the array element holding a node that configures a node pair with the leaf node holding the second position information indicating the storage area in which the index key is stored are read out during the node read-out step;
a writing step of storing the array element number in the stack one before the array element number of the array element holding the leaf node is read out from the stack, the contents of the array element read out in the node read-out step being written into the array element with the array element number; and
a node pair deletion step of releasing the array element pair in which the node pair was stored,
wherein the array element numbers of the array elements stored in the branch nodes and leaf node in the link path traversed until the leaf node are successively being stored in the stack.

6. A tangible non-transitory computer readable medium that holds a program that a computer is caused to execute, for performing the index key deletion method according to claim 5.

7. An index key insertion method using the bit string search apparatus according to claim 1, wherein the bit string search apparatus searches the index keys based on the coupled node tree data structure, the method comprising:

a search start node read-out step of obtaining a position information indicating the position of the search start node, which is one node of a node pair, and reading out the search start node by means of the position information indicating the position of the search start node;

a node type determination step of reading out the node type from the area that holds the node type of the node and determining whether the node type indicates a leaf node or a branch node;

an index key read-out step of reading out the index key from the storage area indicated by the second position information held in the leaf node;

a link step of reading out the discrimination bit position and the first position information indicating the position of a primary node of a node pair that is a link target from the area in the branch node holding the discrimination bit position and from the area holding the first position information indicating the position of the primary node of a node pair that is a link target respectively, and obtaining position information indicating a node position of one of the nodes of a node pair by a calculation with a bit value in the search key for the discrimination bit position read out and the first position information indicating the position of a primary node of a node pair that is a link target, and, from a storage area indicated by the obtained position information indicating the node position, reading out the node stored in the storage area as the link target node; and wherein making, by the node type determination step, a determination of the node type of the search start node read out by the search start node read-out step, wherein if the node type indicates a leaf node, reading out, by the index key read-out step, the index key from the storage area indicated by the second position information held in the leaf node, wherein if the node type indicates a branch node,
  reading out, by the link step, of the link target node and the determination of the node type, by the node type determination step, of the link target node read out is repeated, until the node type indicates a leaf node, and
  reading out, by the index key read-out step, the index key from the storage area indicated by the second position information held in the leaf node, and an index key read out by the index key read-out step is obtained as a search result key of an arbitrary subtree of the coupled node tree by means of the search key, the subtree having the search start node as its root node.

8. A bit string search method according to claim 7, wherein the coupled node tree is stored in an array and the first position information indicating a position of a primary node is an array element number of an array element of the array in which the primary node is stored, and the array element number of an array element in which the search start node is stored and the array element numbers of array elements in which are stored the link target nodes from the search start node up until the leaf node are successively stored in a stack.

9. A tangible non-transitory computer readable medium that holds a program that a computer is caused to execute, for performing the bit string search method according to claim 7.

10. A tangible non-transitory computer readable medium that holds a data structure, for the use of bit string searching by a search key composed of a bit string, that holds position information of storage areas in which are stored index keys composed of bit strings that are the object of searches, comprising:

a coupled node tree having a root node as the starting point of the tree and node pairs which are configurational elements of the tree and which are two nodes, a primary node and a non-primary node, arranged in adjacent areas of storage, wherein the nodes have an area that holds the node type, which indicates whether the node is a branch node or a leaf node, and the branch node having, in addition to the node type, an area that holds a discrimination bit position of the search key and an area holding a first position information indicating a position of a primary node of a node pair that is a link target but not having an area holding a second position information indicating a position of a storage area in which is stored an index key composed of a bit string that is an object of searches, the leaf node having, in addition to the node type, an area holding the second position information indicating the position of the storage area in which is stored the index key composed of a bit string that is the object of searches but not having an area that holds a discrimination bit position of the search key nor an area holding the first position information indicating the position of the primary node of the node pair that is a link target;

wherein by the bit string search apparatus according to claim 1, a search by the search key is enabled such that the node type determination means making a determination of the node type of the search start node read out by the search start node read-out means, and if the node type indicates a leaf node, the index key read-out means reading out the index key from the storage area indicated by the second position information held in the leaf node, and if the node type indicates a branch node, repeating the processes of the link means reading out the link target node and the node type determination means determining the node type of the link target node read out, until the node type indicates a leaf node, and the index key read-out means reading out the index key from the storage area indicated by the second position information held in the leaf node, and the index key read out by the index key read-out means is obtained as a search result key of an arbitrary subtree of the coupled node tree by means of the search key, the subtree having the search start node as its root node.

* * * * *